(12) United States Patent
Hara et al.

(10) Patent No.: US 11,050,900 B2
(45) Date of Patent: Jun. 29, 2021

(54) ELECTRONIC APPARATUS AND IMAGE FORMING APPARATUS CAUSING DISPLAY TO DISPLAY OPERATION PROCEDURE

(71) Applicant: KYOCERA Document Solutions Inc., Osaka (JP)

(72) Inventors: Nobuhiro Hara, Osaka (JP); Ken Saratani, Osaka (JP); Takushi Dandoko, Osaka (JP); Daigo Tashiro, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/945,175

(22) Filed: Jul. 31, 2020

(65) Prior Publication Data
US 2021/0044717 A1  Feb. 11, 2021

(30) Foreign Application Priority Data
Aug. 6, 2019  (JP) .............................. JP2019-144849

(51) Int. Cl.
*G06F 3/12* (2006.01)
*H04N 1/00* (2006.01)

(52) U.S. Cl.
CPC ..... *H04N 1/00973* (2013.01); *H04N 1/00466* (2013.01); *H04N 1/00474* (2013.01); *H04N 1/00482* (2013.01)

(58) Field of Classification Search
None
See application file for complete search history.

(56) References Cited

U.S. PATENT DOCUMENTS

| | | | | |
|---|---|---|---|---|
| 8,280,842 B2* | 10/2012 | Roulland | ................. | G06N 5/04 707/603 |
| 2004/0162890 A1* | 8/2004 | Ohta | ....................... | G06F 9/453 709/218 |
| 2006/0031816 A1* | 2/2006 | Umeda | ............... | G06F 9/45512 717/106 |
| 2006/0044587 A1* | 3/2006 | Yoshida | ............. | H04N 1/00474 358/1.13 |
| 2006/0158686 A1* | 7/2006 | Watanabe | .......... | H04N 1/00962 358/1.15 |
| 2007/0109561 A1 | 5/2007 | Suzue | | |

(Continued)

FOREIGN PATENT DOCUMENTS

JP  2007-140756  6/2007

*Primary Examiner* — Henok Shiferaw
(74) *Attorney, Agent, or Firm* — IP Business Solutions, LLC

(57) ABSTRACT

An electronic apparatus includes a remote operation executor, a support information manager, and a display controller. The remote operation executor executes remote operation that receives the operation support from an operator terminal. The support information manager obtains support information from a support information storage, the support information storage storing, as the support information, operation procedure data indicating a series of operation inputted at the operator terminal. The display controller displays on the display an operation procedure indicated by the operation procedure data included in the support information obtained by the support information manager.

3 Claims, 25 Drawing Sheets

(56) References Cited

U.S. PATENT DOCUMENTS

2010/0302586 A1* 12/2010 Takahashi ............ H04N 1/0044
　　　　　　　　　　　　　　　　　　　　　358/1.15
2016/0054866 A1* 2/2016 Miyamoto ............ H04L 67/125
　　　　　　　　　　　　　　　　　　　　　715/709

* cited by examiner

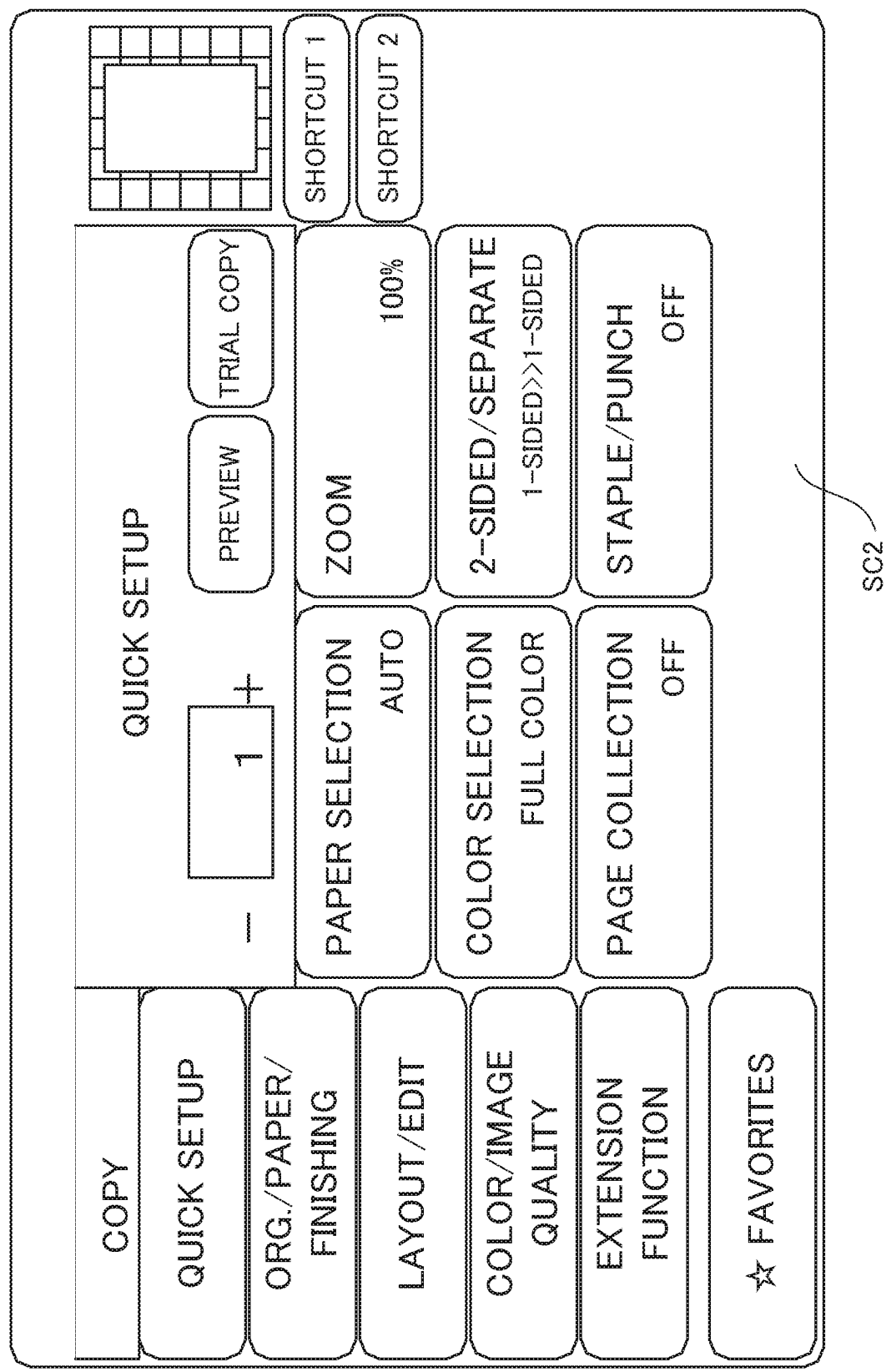

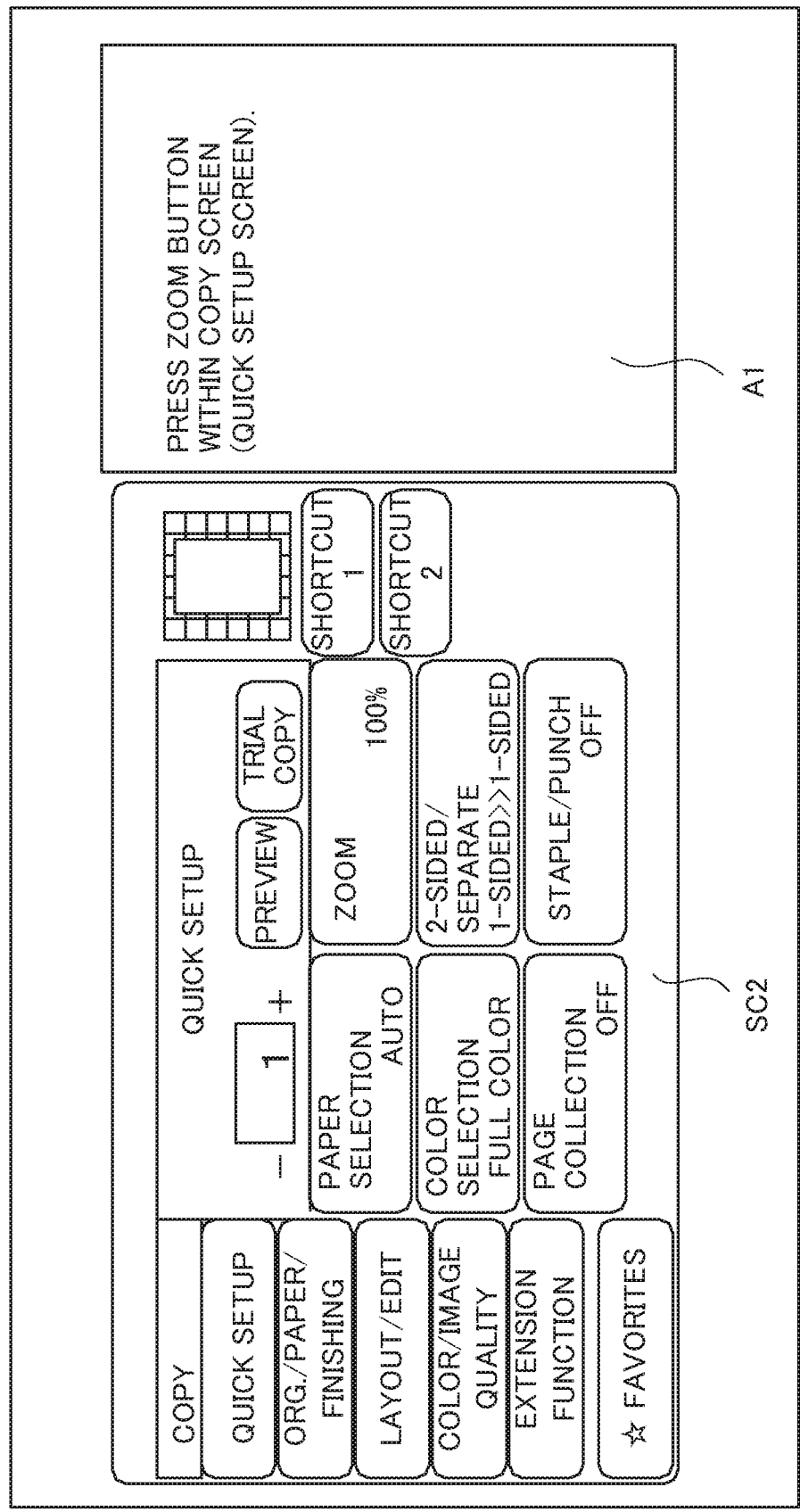

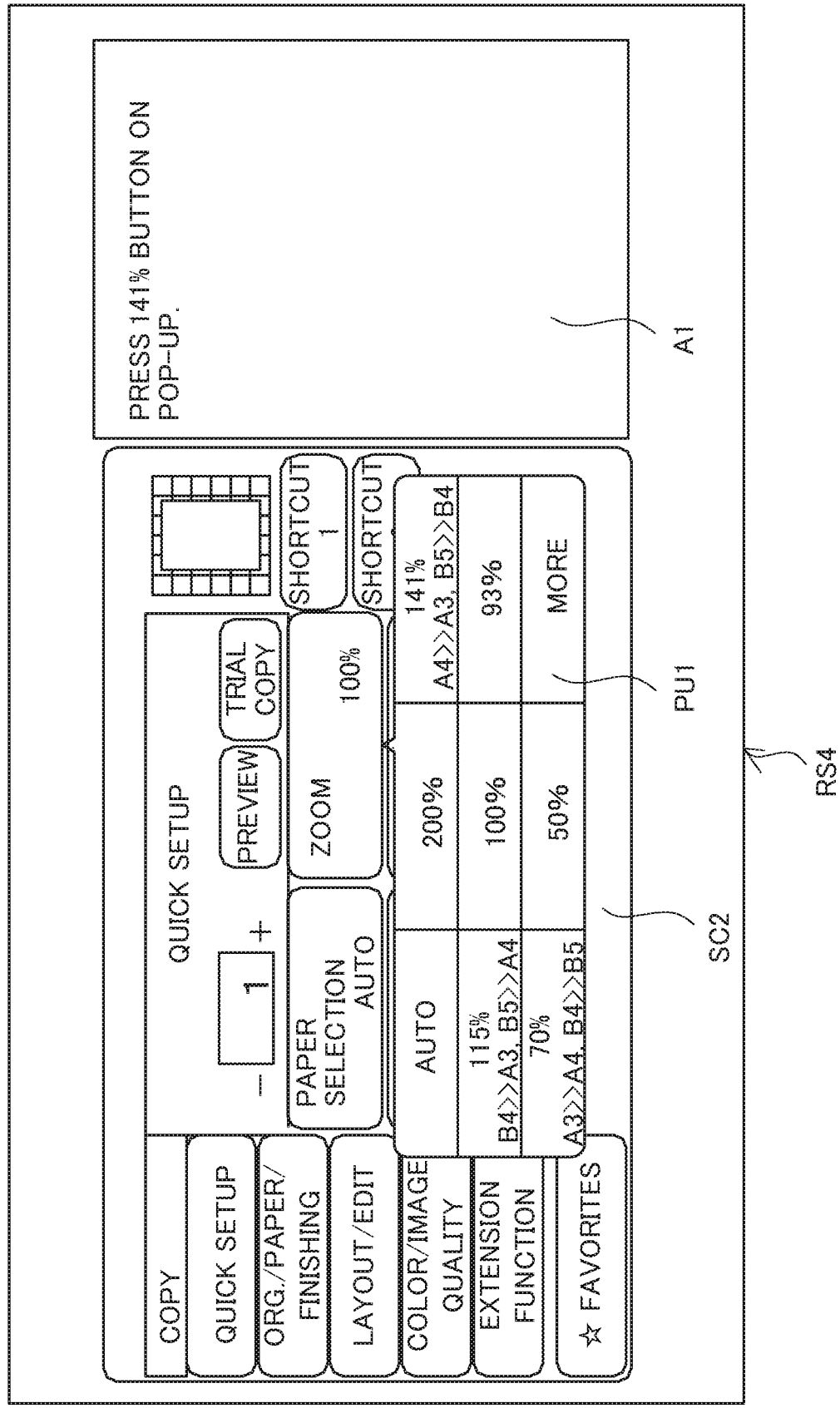

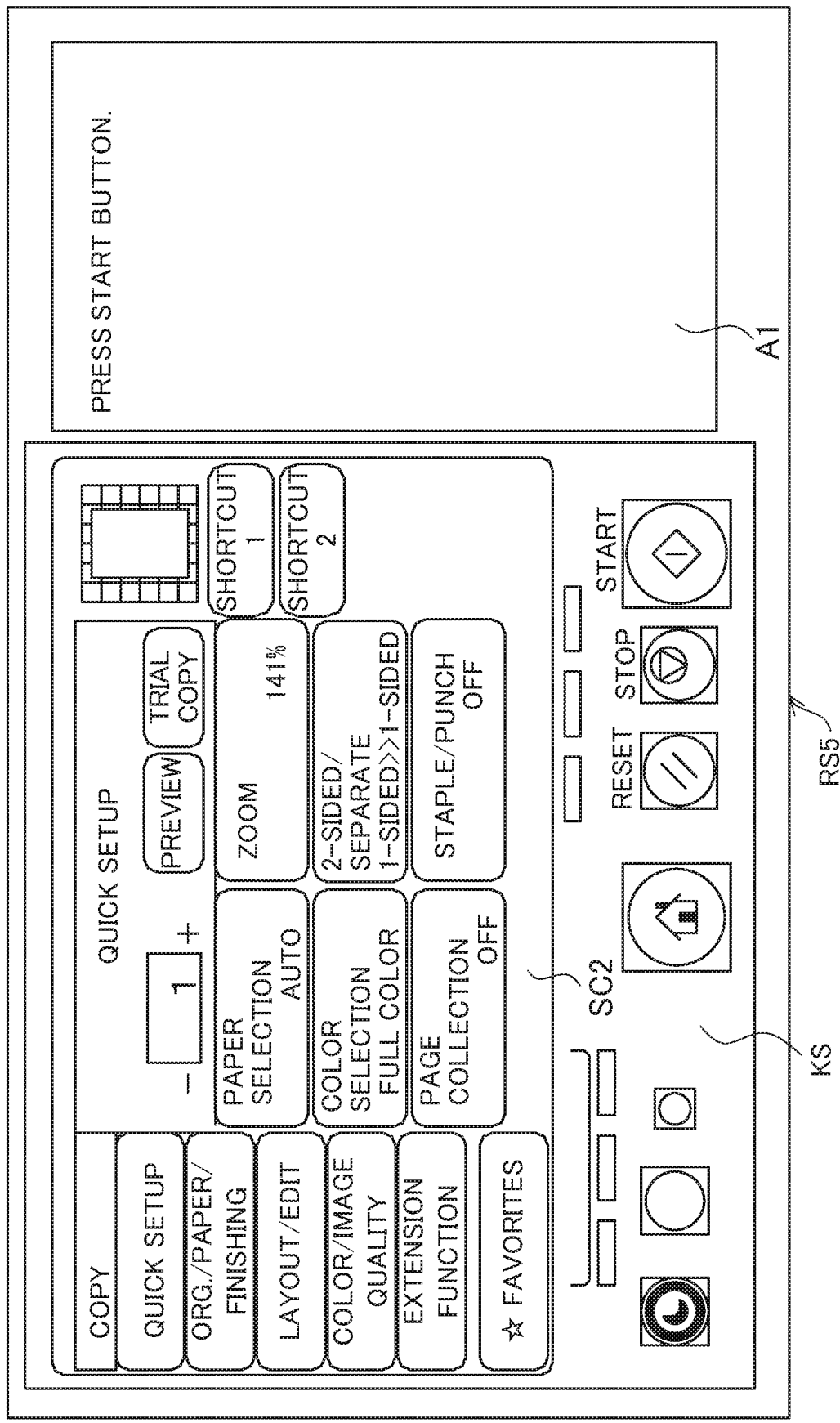

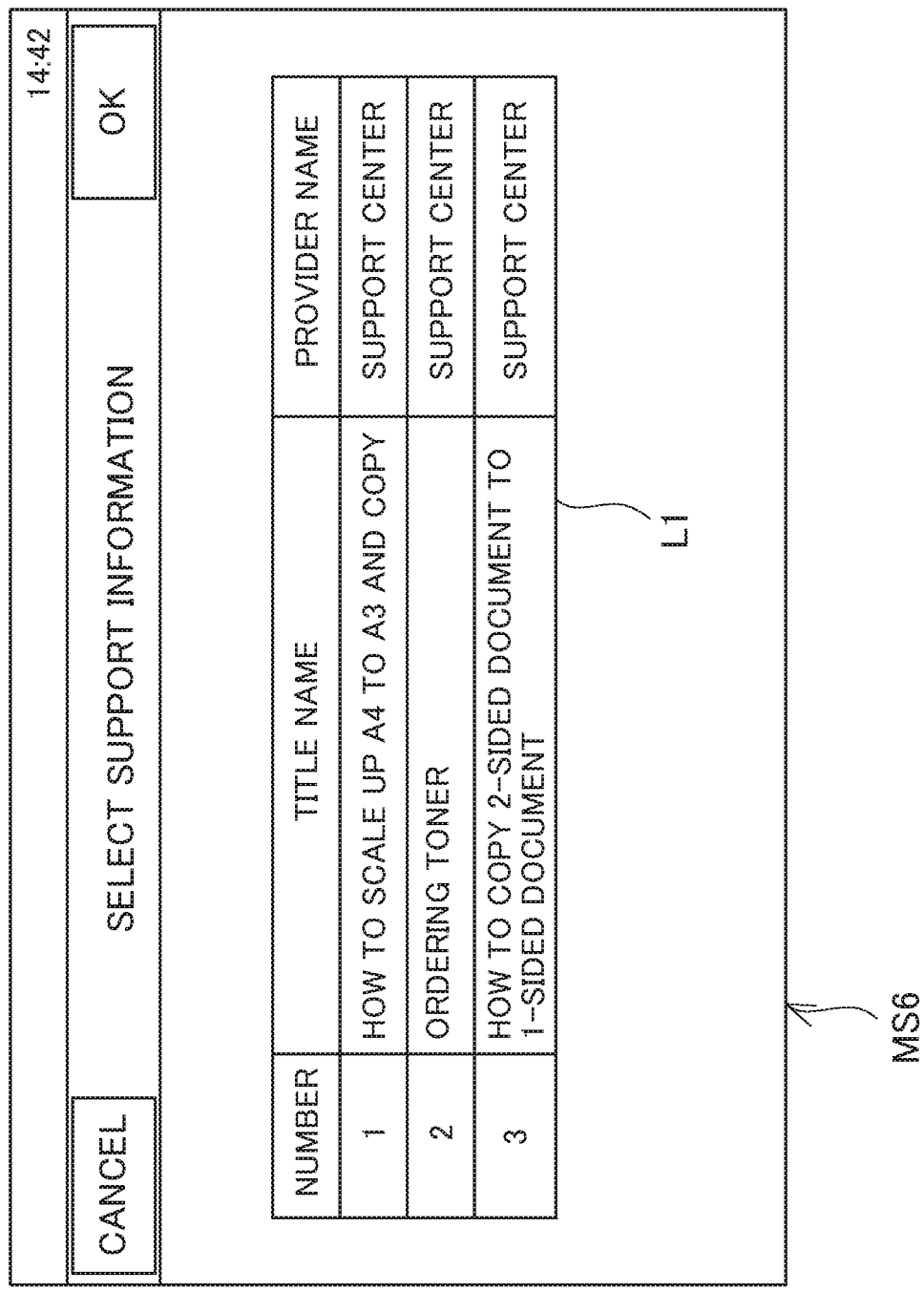

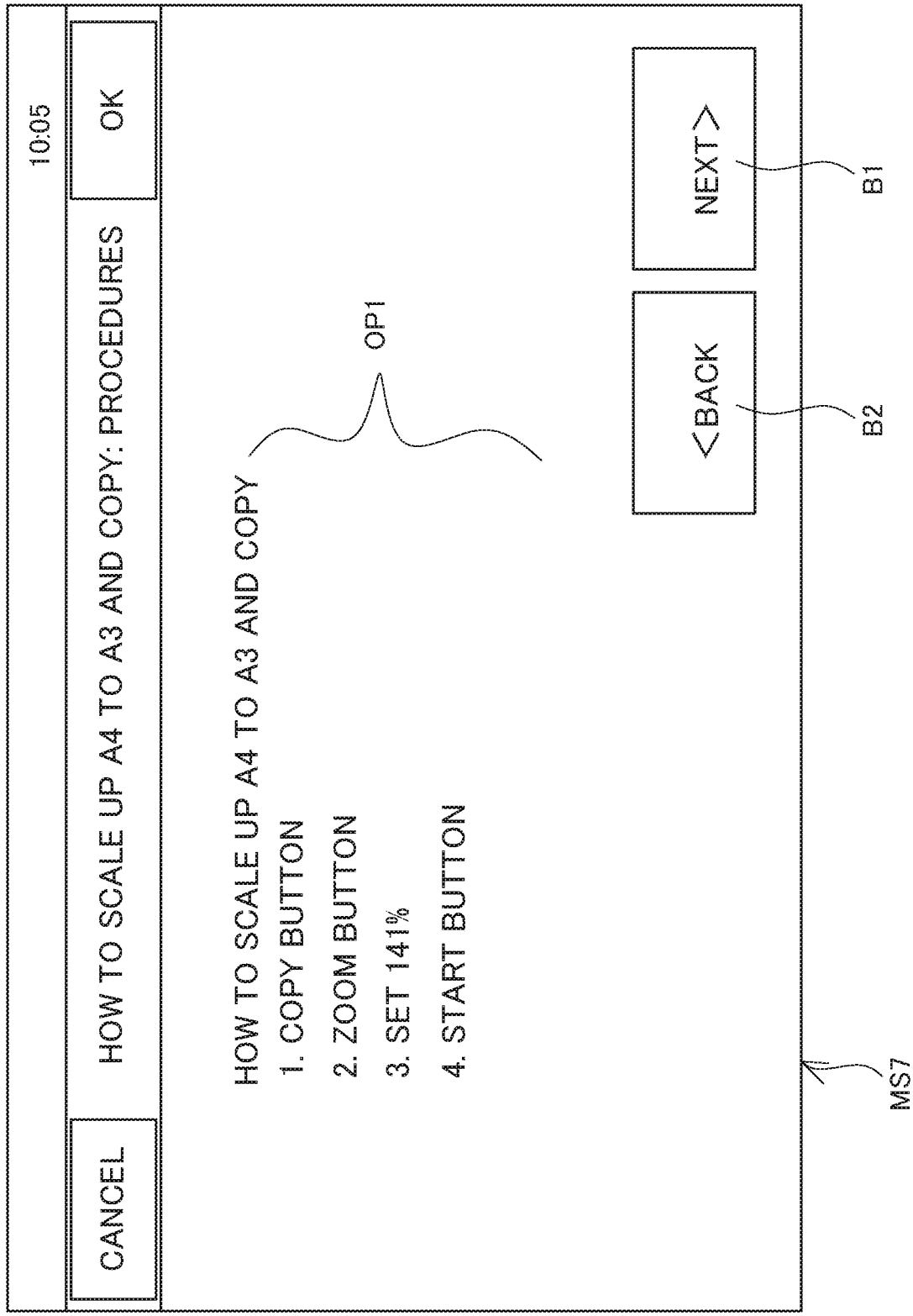

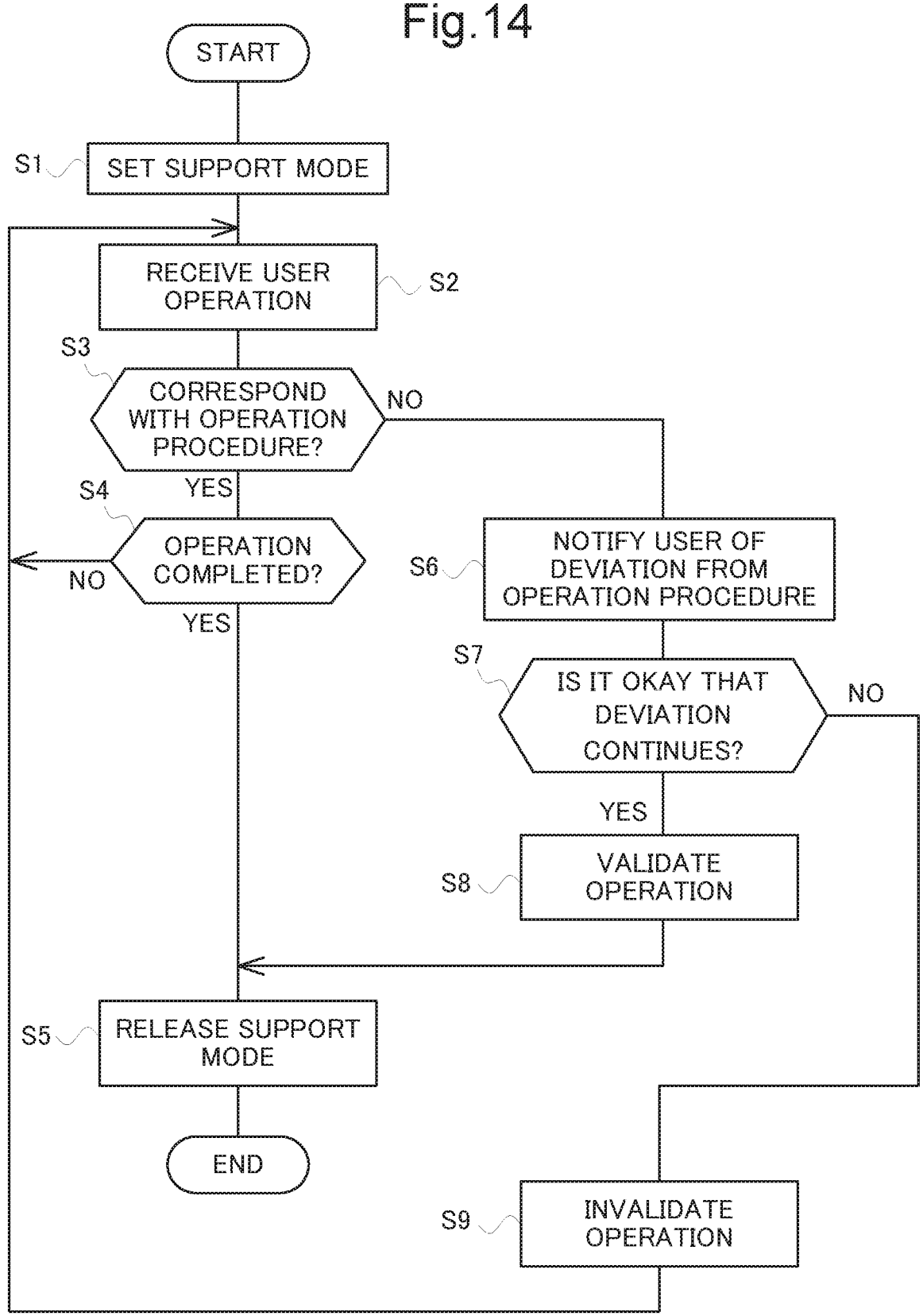

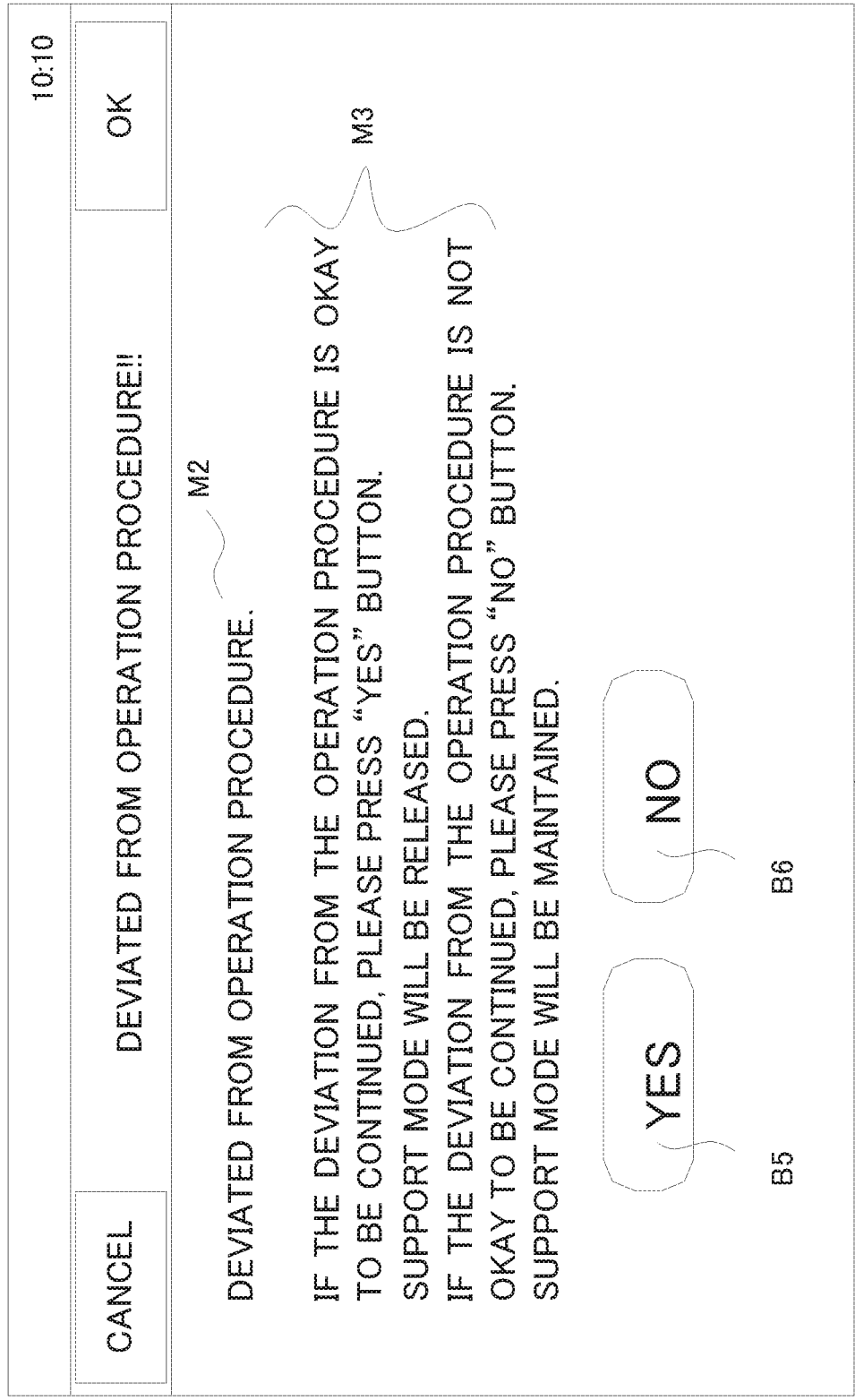

ELECTRONIC APPARATUS AND IMAGE FORMING APPARATUS CAUSING DISPLAY TO DISPLAY OPERATION PROCEDURE

INCORPORATION BY REFERENCE

This application claims priority to Japanese Patent Application No. 2019-144849 filed on Aug. 6, 2019, the entire contents of which are incorporated by reference herein.

BACKGROUND

The present disclosure relates to an electronic apparatus and an image forming apparatus, and particularly relates to a technique for supporting operation.

Various remote operation systems that support operation on electronic apparatuses such as copying machines and multi-functional peripherals, from remote places via networks are proposed. Examples of the remote operation systems include a system that reflects content remotely operated to the electronic apparatus.

For example, there is a technique that records operation content operated at a remote terminal onto a copying machine side in a time series. Recording the operation content operated at the remote terminal allows a user to check the same operation content later on.

SUMMARY

A technique improved over the aforementioned techniques is proposed as one aspect of the present disclosure.

An electronic apparatus according to an aspect of the present disclosure is an electronic apparatus provided with a display, and includes an operation device, a communication device, and a control device. A user instruction is inputted to the operation device from a user. The communication device communicates with an operator terminal capable of performing operation support to the electronic apparatus from a remote place. The control device includes a processor and, through the processor executing a control program, acts as a remote operation executor, an instruction receiver, a support information manager, and a display controller. The remote operation executor executes remote operation that receives the operation support from the operator terminal through the communication device. The instruction receiver receives the user instruction inputted to the operation device. The support information manager causes a support information storage to store operation procedure data as support information, the operation procedure data indicating a series of operation operated in accordance with the remote operation. Based on the support information obtained from the support information storage by the support information manager, the display controller causes the display to display an operation procedure indicated by the operation procedure data included in the support information.

An electronic apparatus according to another aspect of the present disclosure is an electronic apparatus provided with a display, and includes an operation device, a communication device, and a control device. A user instruction is inputted to the operation device from a user. The communication device communicates with an operator terminal capable of performing operation support to the electronic apparatus from a remote place. The control device that includes a processor and, through the processor executing a control program, acts as a remote operation executor, an instruction receiver, a support information manager, and a display controller. The remote operation executor executes remote operation that receives the operation support from the operator terminal through the communication device. The instruction receiver receives the user instruction inputted to the operation device. The support information manager calls out support information from a support information storage, the support information storage storing the operation procedure data indicating a series of operation inputted at the operator terminal as the support information. Based on the support information obtained by the support information manager, the display controller causes the display to display an operation procedure indicated by the operation procedure data included in the support information. When the display controller is in a state of causing the display to display the operation procedure indicated by the operation procedure data, the display controller changes a display manner of an operation button that should be operated to be different from a display manner of other operation button, or the instruction receiver does not receive operation on an operation button that should not be operated.

An image forming apparatus according to still another aspect of the present disclosure includes the above-described electronic apparatus, and an image forming device that forms an image on a recording medium.

BRIEF DESCRIPTION OF THE DRAWINGS

FIG. 2A and FIG. 2B are diagrams each showing an example of a screen displayed on the image forming apparatus.

FIG. 5A shows an operation screen displayed on the operator terminal, and FIG. 5B shows an operation screen displayed on the image forming apparatus.

FIG. 6A and FIG. 6B are diagrams each showing an example of the screen switching when the remote operation is under execution; FIG. 6A shows the operation screen displayed on the operator terminal, and FIG. 6B shows the operation screen displayed on the image forming apparatus.

FIG. 7A and FIG. 7B are diagrams each showing an example of the screen switching when the remote operation is under execution; FIG. 7A shows the operation screen displayed on the operator terminal, and FIG. 7B shows the operation screen displayed on the image forming apparatus.

FIG. 8A and FIG. 8B are diagrams each showing an example of the screen switching when the remote operation is under execution; FIG. 8A shows the operation screen displayed on the operator terminal, and FIG. 8B shows the operation screen displayed on the image forming apparatus.

FIG. 9 is a diagram showing an example of a screen displayed on a display of the image forming apparatus.

FIG. 10A and FIG. 10B are diagrams each showing an example of screen switching when presenting support information to a user, and each showing an operation screen displayed on the display of the image forming apparatus.

FIG. 14 is a flowchart showing an example of processing operation performed at a control device of the image forming apparatus.

FIG. 15 is a diagram showing an example of the screen displayed on the display of the image forming apparatus.

DETAILED DESCRIPTION

Figure 1:
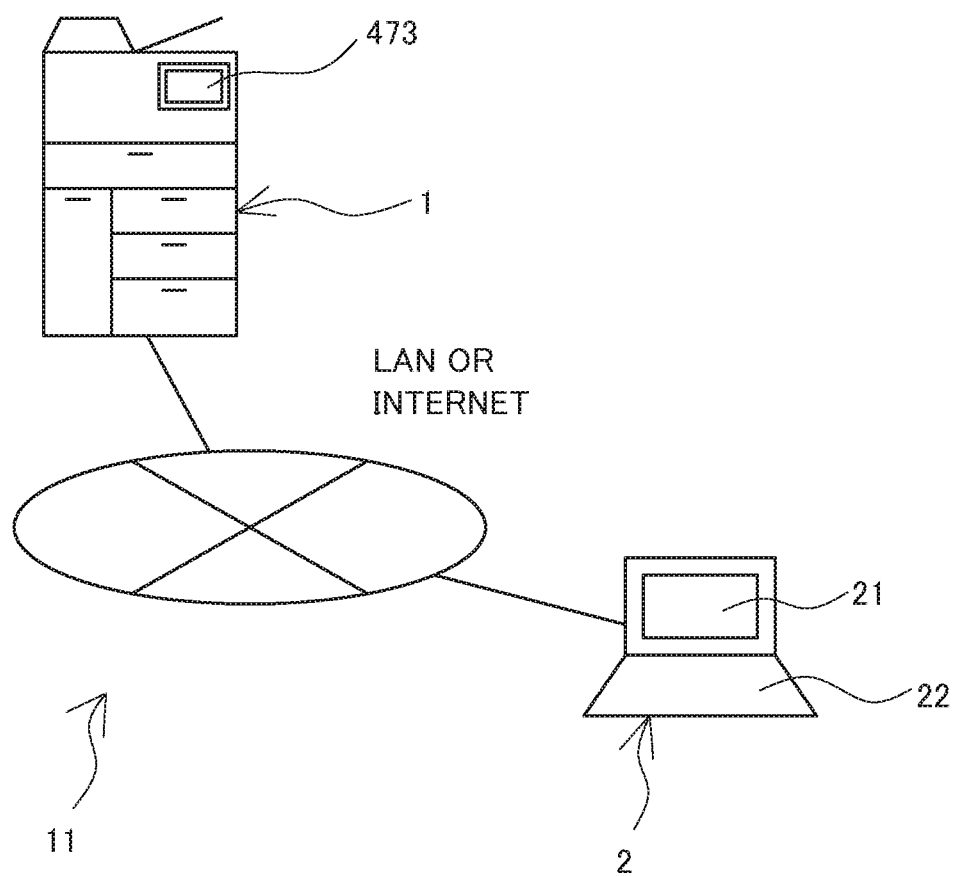
FIG. 1 is a diagram showing an entire configuration of a remote operation system formed by including an image forming apparatus being as one embodiment of an electronic apparatus according to the present disclosure.

Hereinafter, a description will be given of an electronic apparatus and an image forming apparatus according to an embodiment of the present disclosure with reference to the drawings. FIG. 1 is a diagram showing an entire configuration of a remote operation system formed by including the image forming apparatus being as one embodiment of the electronic apparatus according to the present disclosure. A remote operation system 11 includes an image forming apparatus 1 and an operator terminal 2. The image forming apparatus 1 is provided with a display 473 having a touch panel function and is, for example, a multi-functional peripheral equipped with a copy function, a printer function, a scanner function, and a facsimile function. Components of the image forming apparatus 1, except an image forming device 12 and a fixing device 13 to be described later, form the electronic apparatus according to the present embodiment.

The operator terminal 2 is provided with a display 21 having a touch panel function and with a keyboard 22. The operator terminal 2 is for example a personal computer. The operator terminal 2 is capable of performing operation support to the image forming apparatus 1 from a remote place via the network, and displays the operation screen displayed on the display 473 of the image forming apparatus 1 on the display 21.

Figure 2A:
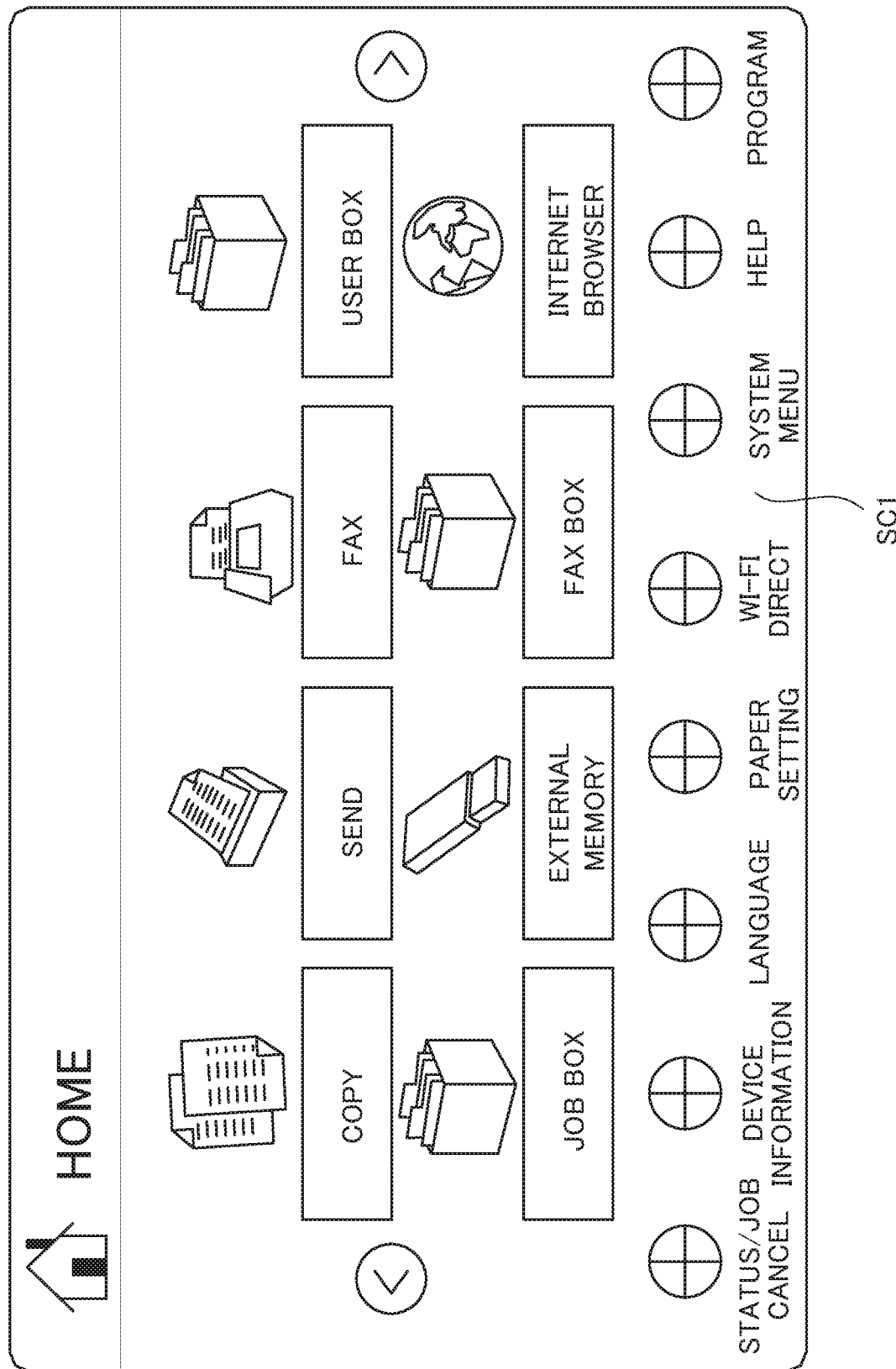

FIG. 2A and FIG. 2B are diagrams each showing an example of a screen displayed on the display 473 of the image forming apparatus 1. An operation screen SC1 shown in FIG. 2A is a "home" screen, and buttons such as "copy", "send", and so on are formed. Pressing of the "copy" button displays an operation screen SC2 shown in FIG. 2B on the display 473.

The operation screen SC2 is a "quick setup" screen within the "copy" screen. Within the "copy" screen, there are screens for "original/paper/finishing", "layout/edit", and so on, other than the "quick setup" screen, but the "quick setup" screen is set at the upmost level. When a user presses the "copy" button on the "home" screen, a touch panel provided on the display 473 (FIG. 4) receives the pressing and an instruction receiver 101 (FIG. 4) receives a display instruction of the "quick setup" screen associated with the pressing. In accordance with this instruction, the display controller 104 (FIG. 4) causes the display 473 to display the "quick setup" screen.

On the operation screen SC2, which is the "quick setup" screen, six buttons respectively associated with six major functions are displayed: i.e., buttons marked with "paper selection", "color selection", "page collection", "zoom", "2-sided/separate", and "staple/punch".

On the operation screen SC2, for example, when the user presses down the button marked with "color selection", the touch panel receives the pressing, and the instruction receiver 101 (FIG. 4) receives a display instruction of a pop-up by which the color mode can be selected, the display instruction being associated with the pressing. In accordance with this instruction, the display controller 104 (FIG. 4) causes the display 473 to display the pop-up. There are three setting items: that are, "automatic color" mode performing printing by identifying between a color document and a monochrome document, "full color" mode performing printing in full color, and "monochrome" mode performing printing in black and white.

On the operation screen SC2, for example, when the button marked with "zoom" is pressed, the touch panel receives the pressing and the instruction receiver 101 (FIG. 4) receives a display instruction of a pop-up by which copy magnification (setting value) can be set, the display instruction being associated with the pressing. In accordance with this instruction, the display controller 104 (FIG. 4) causes the display 473 to display the pop-up. There are, for example, "automatic", "200%", "141%", "100%", and "93%" for setting items.

On the operation screen SC2, for example, when the button marked with "original/paper/finishing" is pressed, the touch panel receives the pressing and the instruction receiver 101 (FIG. 4) receives a display instruction of an operation screen for "original/paper/finishing", the display instruction being associated with the pressing. In accordance with this instruction, the display controller 104 (FIG. 4) causes the display 473 to display the operation screen. On the operation screen for "original/paper/finishing", when the user presses a button marked with "layout/edit", the touch panel receives the pressing and the instruction receiver 101 (FIG. 4) receives a display instruction of the operation screen for "layout/edit", the display instruction being associated with the pressing. In accordance with this instruction, the display controller 104 (FIG. 4) causes the display 473 to display the operation screen.

Figure 3A:
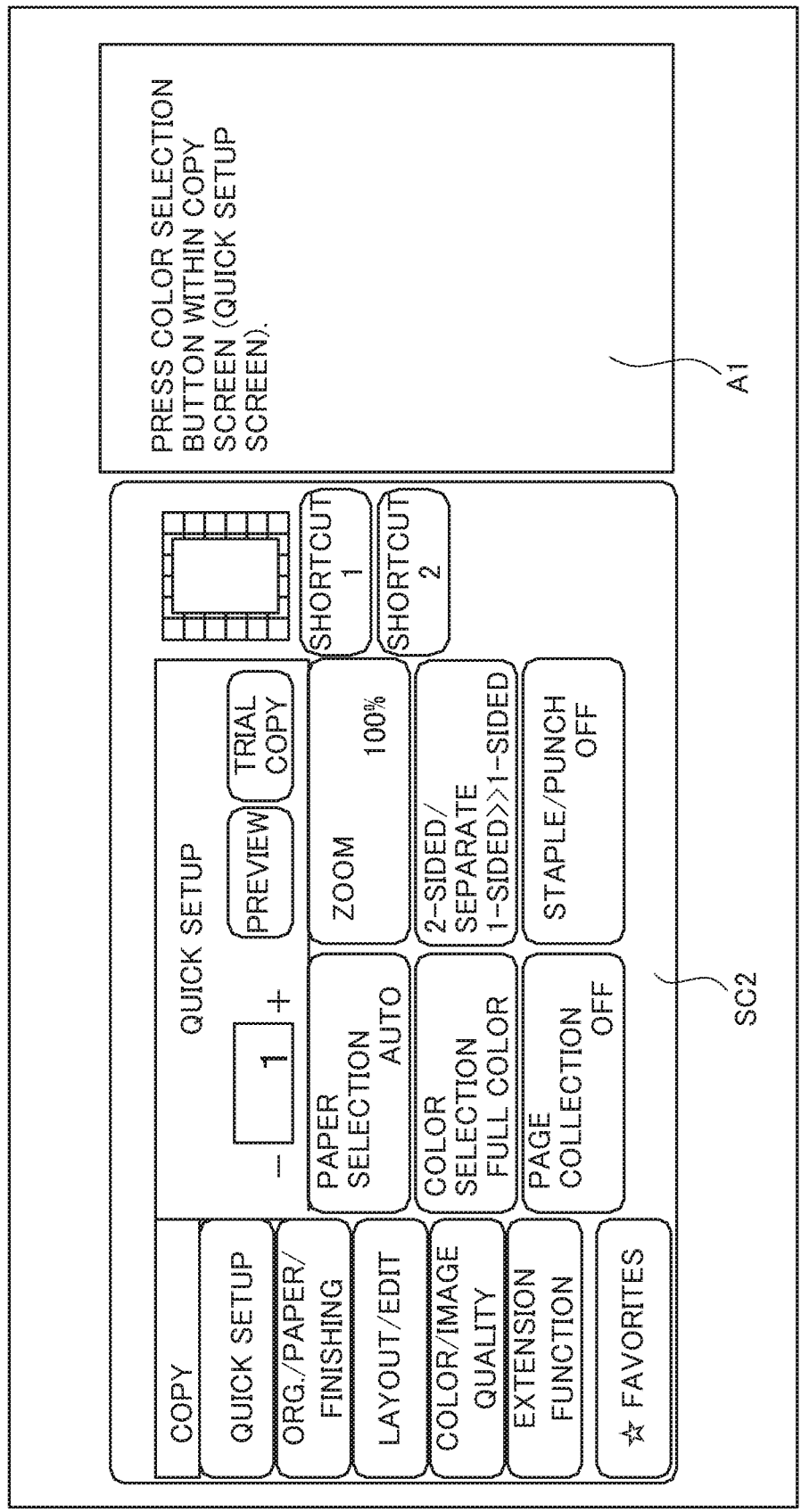
FIG. 3A is a diagram showing an example of a screen displayed on an operator terminal when remote operation is under execution.

FIG. 3A is a diagram showing an example of a screen displayed on the display 21 of the operator terminal 2 by the control from the display controller 104 when remote operation is under execution. An operation screen RS1 displayed on the display 21 includes an operation screen (here, it is shown as the operation screen SC2 in FIG. 2B) displayed on the display 473 of the image forming apparatus 1 at the time of actual operation and also includes an input area A1 for displaying a text (including not only characters but also figures) that the operator inputs using the keyboard 22. The operator can input a supplementary explanation for the operation through operating the keyboard 22 to input characters and others in the input area A1.

Figure 3B:
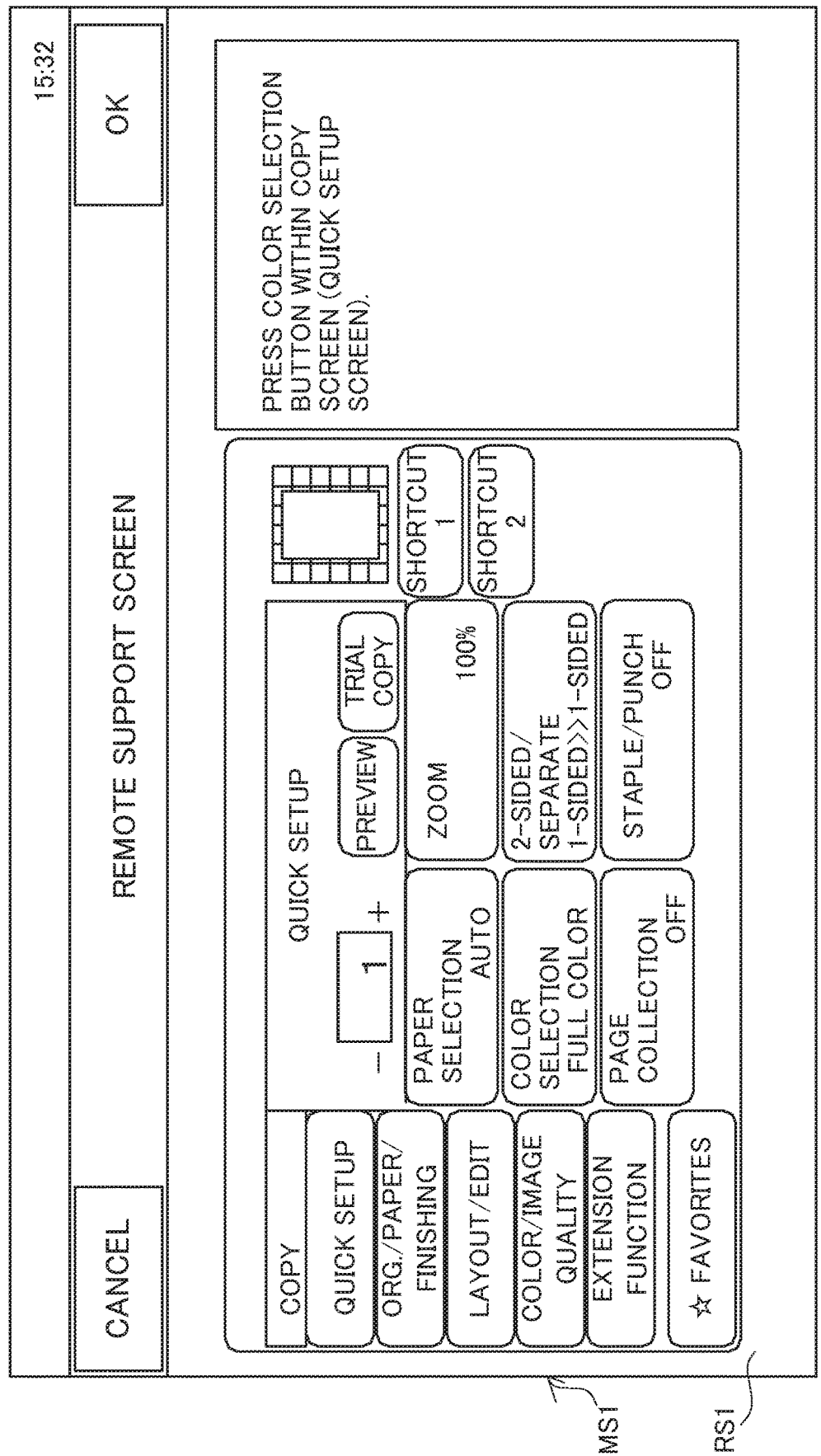
FIG. 3B is a diagram showing an example of a screen displayed on the image forming apparatus when the remote operation is under execution.

FIG. 3B is a diagram showing an example of a screen displayed on the display 473 of the image forming apparatus 1 by the control from the display controller 104 when remote operation is under execution. An operation screen MS1 displayed on the display 473 displays the operation screen RS1 displayed on the operator terminal 2. In other words, the screen is shared with the operator terminal 2.

Figure 4:
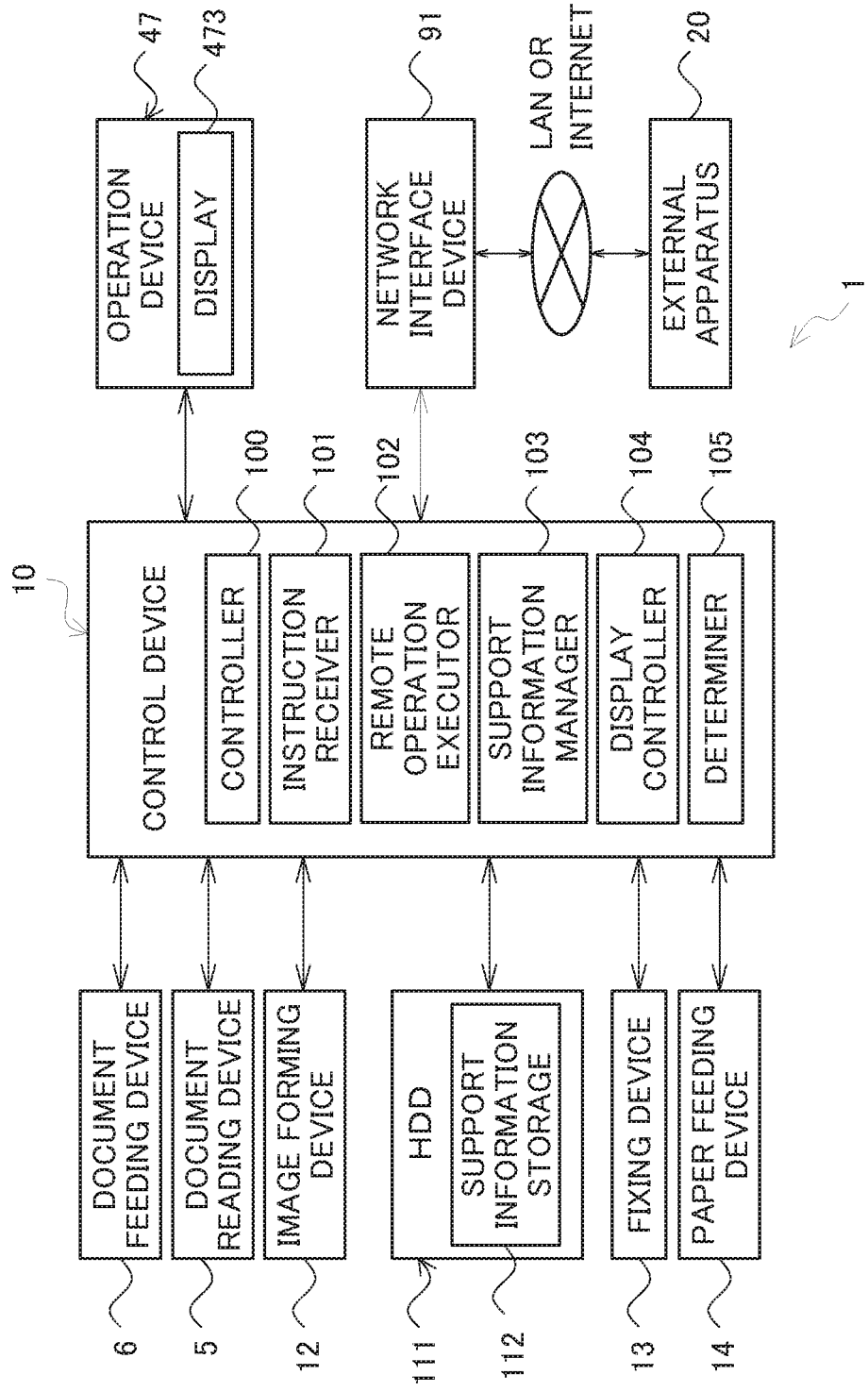
FIG. 4 is a functional block diagram schematically showing main internal configurations of the image forming apparatus.

FIG. 4 is a functional block diagram schematically showing main internal configurations of the image forming apparatus 1. The image forming apparatus 1 is formed by including a control device 10, a document feeding device 6, a document reading device 5, the image forming device 12, a hard disk drive (HDD) 111, the fixing device 13, a paper feeding device 14, the operation device 47, and a network interface device 91.

Description will be given for document reading operation performed by the image forming apparatus 1. The document reading device 5 optically reads an image of a document fed to the document reading device 5 by the document feeding device 6 or an image of a document placed on not-illustrated contact glass, and generates image data. The image data generated by the document reading device 5 is stored in a not-illustrated image memory or the like.

Description will be given for image forming operation performed by the image forming apparatus 1. Based on, for example, the image data generated by the document reading operation, the image data stored in the image memory, and the image data received from a computer (an external device 20) connected via a network, the image forming device 12 forms a toner image on a recording sheet, being as a recording medium, fed from the paper feeding device 14. The image forming device 12 includes an image forming unit for magenta, an image forming unit for cyan, an image forming unit for yellow, an image forming unit for black, an intermediate transfer belt (image carrier), and a secondary transfer roller, all of which are not illustrated. Each of these image forming units includes a photosensitive drum, a developing device, a charging device, an exposure device, and a primary transfer roller.

The HDD 111 is a large capacity storage device. The HDD 111 includes a support information storage 112 storing as the support information the operation procedure data that indicates a series of operations sent from the operator terminal 2 (see FIG. 1). The support information storage 112 is, for example, formed of a partial region of the HDD 111. The support information storage 112 may be provided in any of the image forming apparatus 1, the operator terminal 2, and a server on the network. If provided in the image forming apparatus 1, the support information storage 112 is formed in the HDD 111 through installation of a control program to be described later.

The fixing device 13 applies heat and pressure on the recording sheet on which the toner image is formed by the image forming device 12, to thereby fix the toner image onto the recording sheet. The recording sheet having gone through the fixing processing is outputted to a not-illustrated output tray. The paper feeding device 14 has paper feed cassettes.

The operation device 47 accepts instructions from an operator for various types of operation and processing executable by the image forming apparatus 1, such as an instruction to execute the image forming operation. The operation device 47 includes the display device 473 that displays operation guidance and other types of information for the operator.

The display 473 is a display device provided with the touch panel at the front side of its screen. This configuration allows the operator to operate the image forming apparatus 1 by touching buttons and keys displayed on the screen of the display 473.

The network interface device 91 is a communication interface having a communication module, such as a not-illustrated LAN chip. The network interface device 91 sends and receives various data to and from the external apparatus 20 (for example, the operator terminal 2 shown in FIG. 1) on the LAN or the Internet. The network interface device 91 is one example of the communication device recited in What is claimed is.

The control device 10 is formed by including a processor, a random access memory (RAM), a read only memory (ROM), and a dedicated hardware circuit. The processor is, for example, a central processing unit (CPU), an application specific integrated circuit (ASIC), or a micro processing unit (MPU). The control device 10 includes a controller 100, the instruction receiver 101, a remote operation executor 102, a support information manager 103, the display controller 104, and a determiner 105.

When the above processor operates in accordance with the control program stored on the HDD 11 or others, the control device 10 acts as the controller 100, the instruction receiver 101, the remote operation executor 102, the support information manager 103, the display controller 104, and the determiner 105. Alternatively, each of the controller 100 and other aforesaid components may not be implemented by the operation in accordance with the control program by the control device 10, but may be constituted by a hardware circuit. Hereinafter, the same applies to the other embodiments unless otherwise stated.

The controller 100 governs overall operation control of the image forming apparatus 1. The controller 100 is connected to the document feeding device 6, the document reading device 5, the image forming device 12, the HDD 111, the fixing device 13, the paper feeding device 14, the operation device 47, and the network interface device 91 and controls the operations of these components. For example, the controller 100 controls the image forming device 12 to form the image on the recording medium.

The instruction receiver 101 receives input of an instruction from the user through the operation device 47. The instruction receiver 101 receives the instruction from the user performed on hard keys provided on the operation device 47, and furthermore, receives, through the touch panel provided on the display 473, the instruction associated with the instruction (touch operation) from the user performed on the operation screen displayed on the display 473.

The remote operation executor 102 executes processing necessary for the remote operation that receives an operation support from the operator terminal 2 through the network interface device 91.

In receiving screen data of the operation screen (for example, the operation screen RS1 shown in FIG. 3A) for the operation support that is being sent form the operator terminal 2, the remote operation executor 102 causes the display 473 to display, as a remote support screen, a screen (for example, the operation screen MS1 shown in FIG. 3B) based on the received screen data. Thereby, the screen is shared with the operator terminal 2.

Also, in receiving an operation command that is being sent form the operator terminal 2, the remote operation executor 102 executes processing in accordance with the received operation command. Thereby, the remote operation on the image forming apparatus 1 can be performed from the operator terminal 2. Here, instead of actually operating the image forming apparatus 1 based on the operation command from the operator terminal 2, the remote operation executor 102 may be configured to give only an operation advice to the user, so that the actual operation is to be performed by the user.

FIG. 5A to FIG. 8B are diagrams each showing an example of screen switching when the remote operation is under execution. FIG. 5A, FIG. 6A, FIG. 7A, and FIG. 8A respectively show the operation screens displayed on the display 21 of the operator terminal 2. FIG. 5B, FIG. 6B, FIG. 7B, and FIG. 8B respectively show the operation screens displayed on the display 473 of the image forming apparatus 1. Hereinafter, a case where the user requests the operator to explain "how to scale up A4 to A3 and copy" will be described as an example.

Figure 5A:
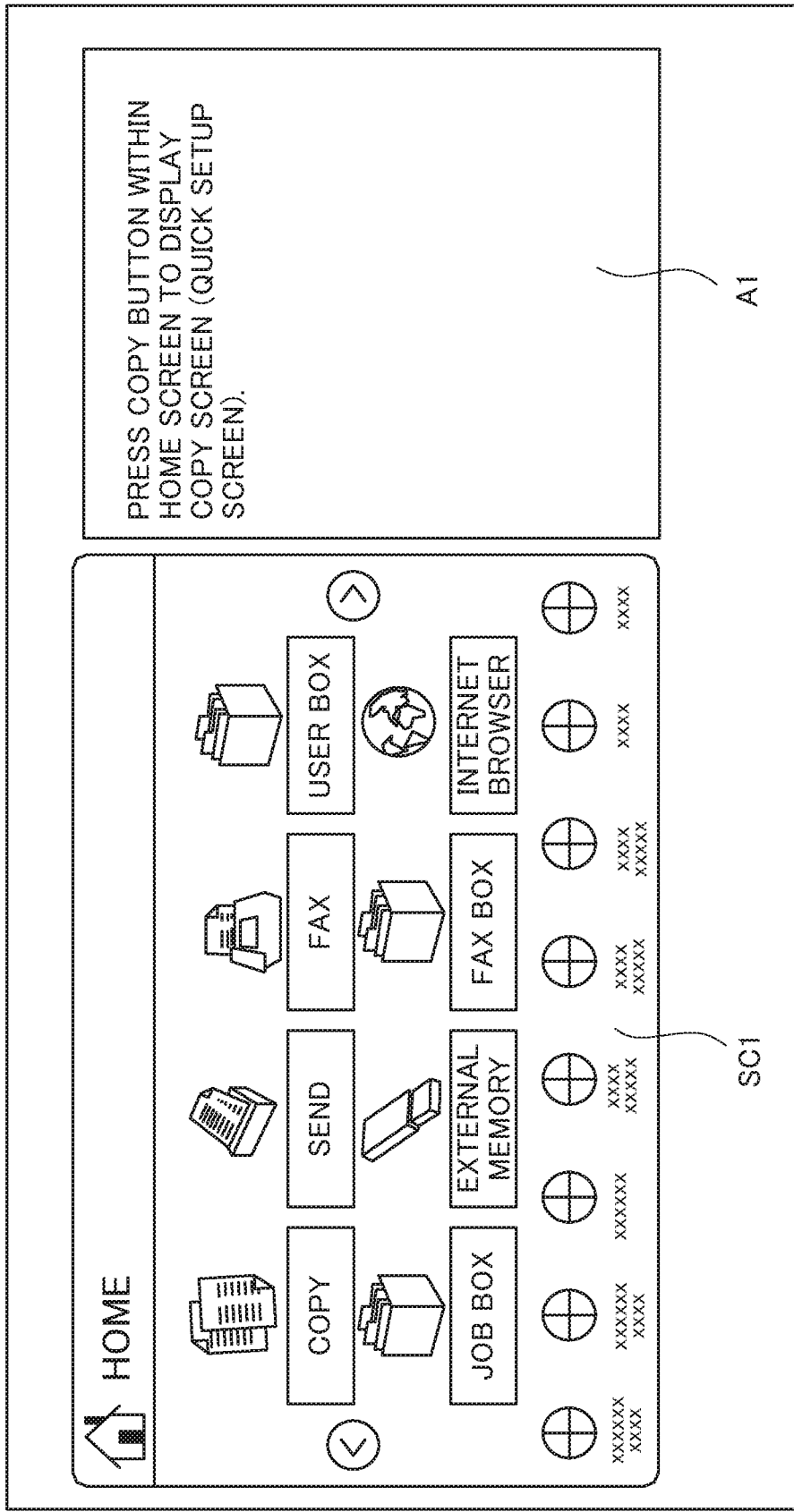
FIG. 5A and FIG. 5B are diagrams each showing an example of screen switching when the remote operation is under execution.
Figure 5B:
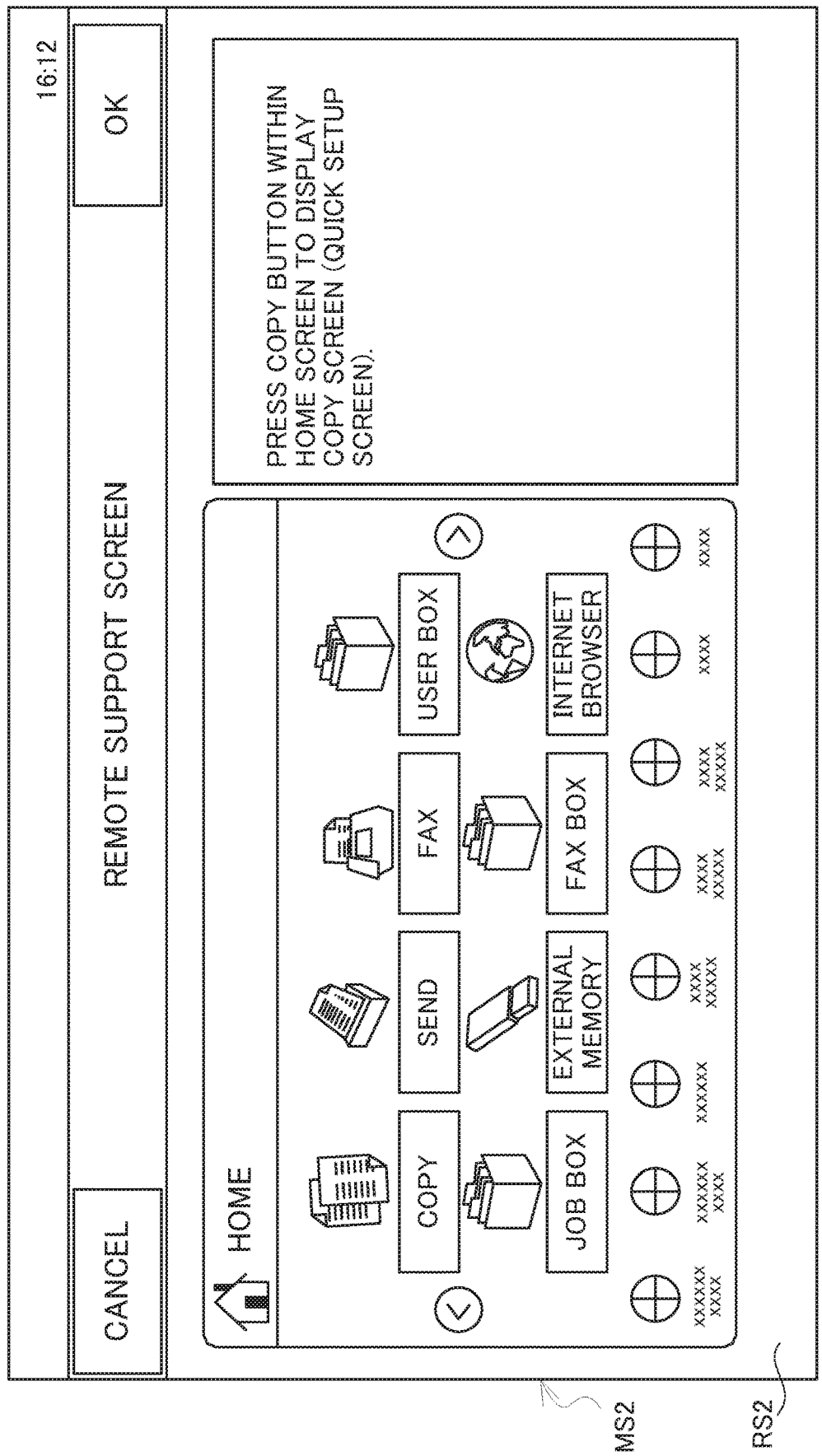

An operation screen RS2 displayed on the display 21 of the operator terminal 2 shown in FIG. 5A includes the operation screen SC1, which is the "home" screen displayed on the display 473 of the image forming apparatus 1 at the time of actual operation, and the input area A1 is displayed on the operation screen RS2. An operation screen MS2 displayed on the display 473 of the image forming apparatus 1 shown in FIG. 5B includes, in a part thereof, the operation screen RS2 displayed on the operator terminal 2. If audio data indicating a supplementary explanation is being sent from the operator terminal 2 to the image forming apparatus 1, the controller 100 may be configured to output the audio indicated by the audio data from a not-illustrated speaker.

On the operation screens RS2 and MS2, it is explained that the "copy" button within the "home" screen should be pressed. At a time where the operation screen MS2 is being displayed on the display 473 of the image forming apparatus 1, the operation command of pressing down the "copy" button is sent from the operator terminal 2 to the image forming apparatus 1 by the instruction of the operator.

Figure 6B:
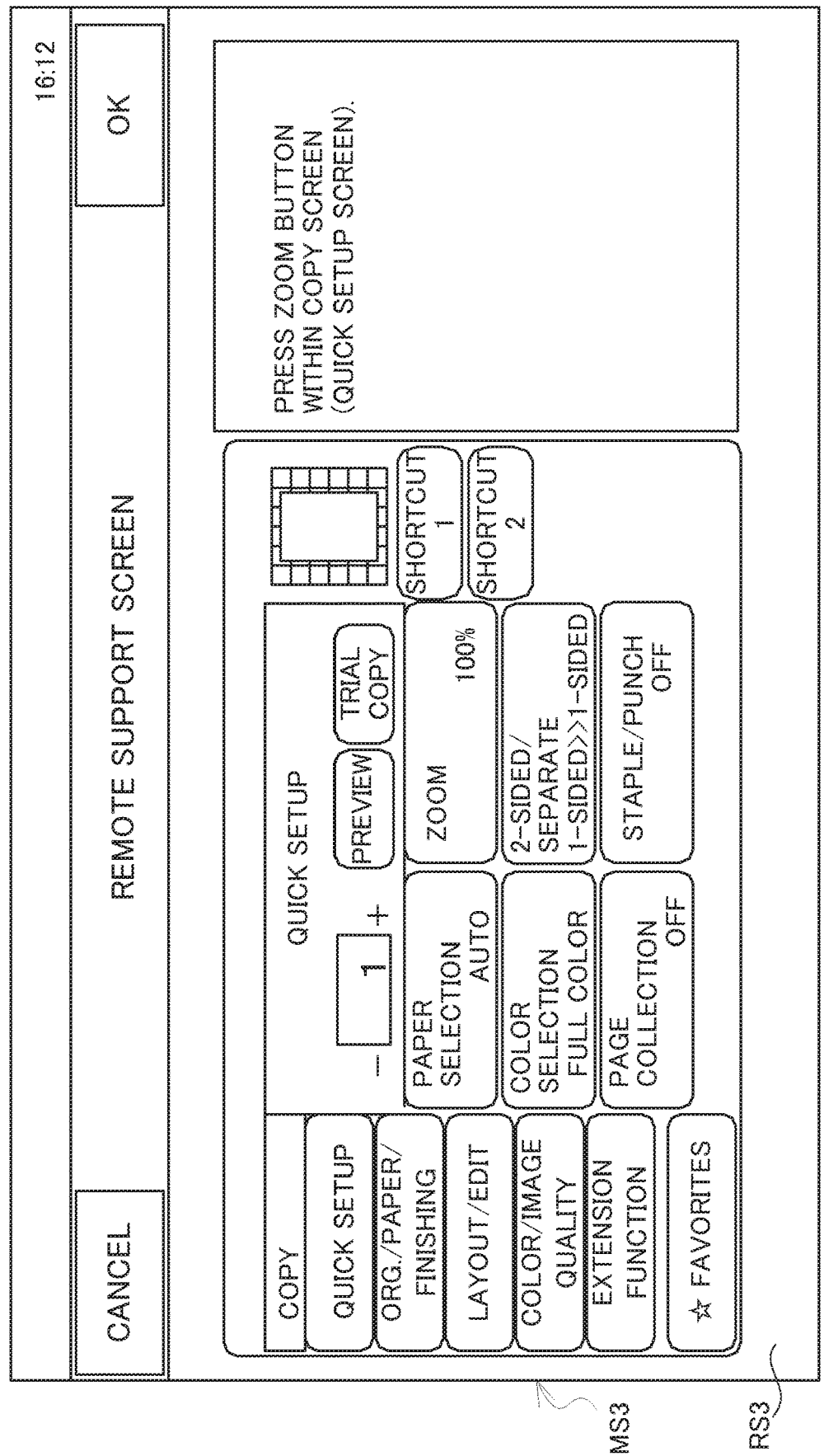

An operation screen RS3 shown in FIG. 6A includes the operation screen SC2 that is displayed when the "copy" button is pressed on the "home" screen. The operation screen SC2 is the "quick setup" screen within the "copy" screen. An operation screen MS3 shown in FIG. 6B includes the operation screen RS3 displayed on the operator terminal 2.

On the operation screens RS3 and MS3, it is explained that the "zoom" button within the "copy" screen should be pressed. At a time where the operation screen MS3 is being displayed on the display 473, the operation command of pressing down the "zoom" button is sent from the operator terminal 2 to the image forming apparatus 1 by the instruction of the operator.

Figure 7B:
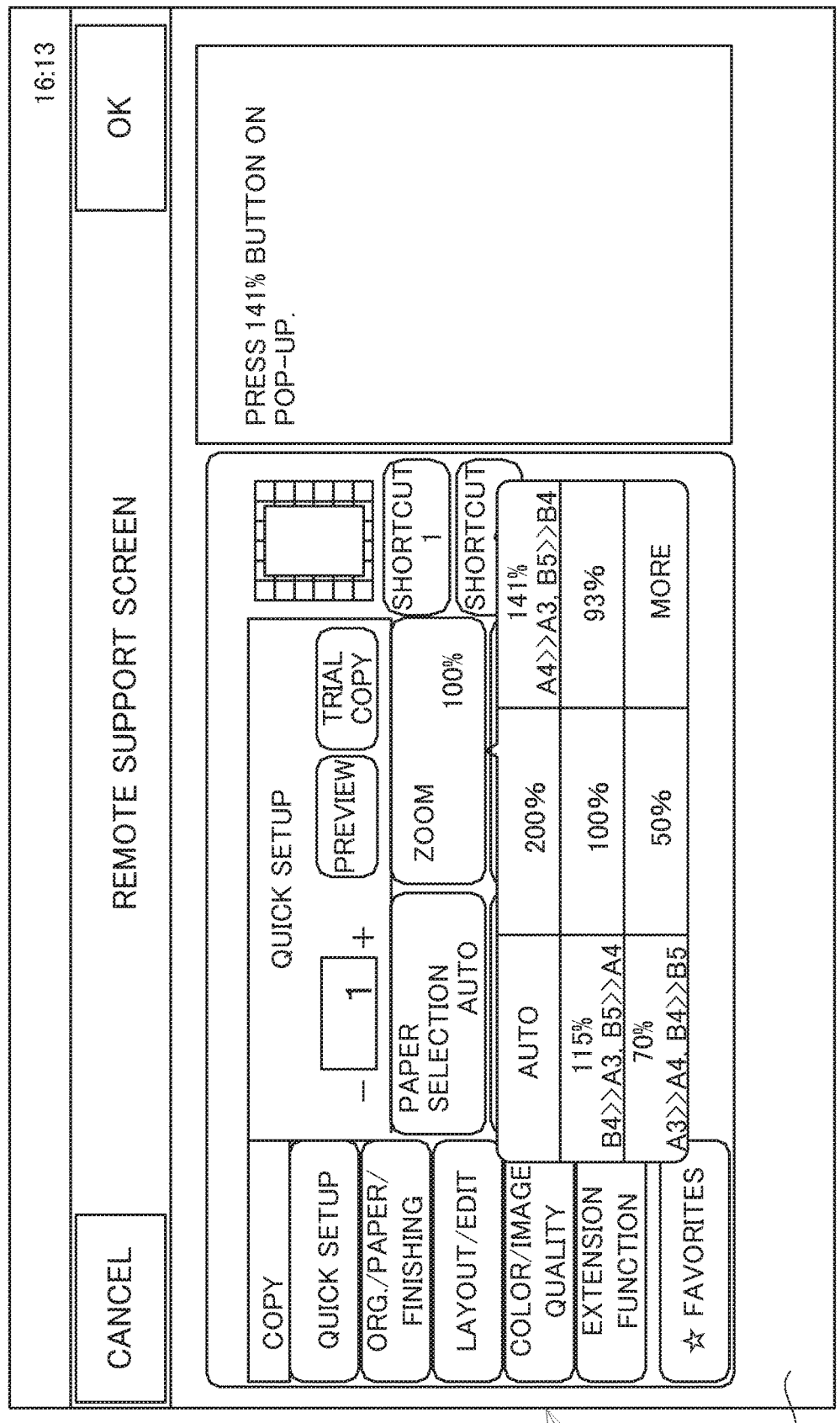

An operation screen RS4 shown in FIG. 7A includes a pop-up PU1: when the user presses the "zoom" button on the "copy" screen on the display screen of the display 473 of the image forming apparatus 1, in accordance with the instruction corresponding to the pressing, the display controller 104 causes the display 473 to display the pop-up PU1 on the operation screen SC2. An operation screen MS4 shown in FIG. 7B is a display screen to be displayed on the display 473 of the image forming apparatus 1 and includes the operation screen RS4 to be displayed on the operator terminal 2.

On the operation screens RS4 and MS4, it is explained that the "141% (A4>>A3, B5>>B4)" button on the pop-up PU1 should be pressed. At a time where the operation screen MS4 is being displayed on the display 473, the operation command of pressing down the "141%" button is sent from the operator terminal 2 to the image forming apparatus 1 by the instruction of the operator.

Figure 8B:
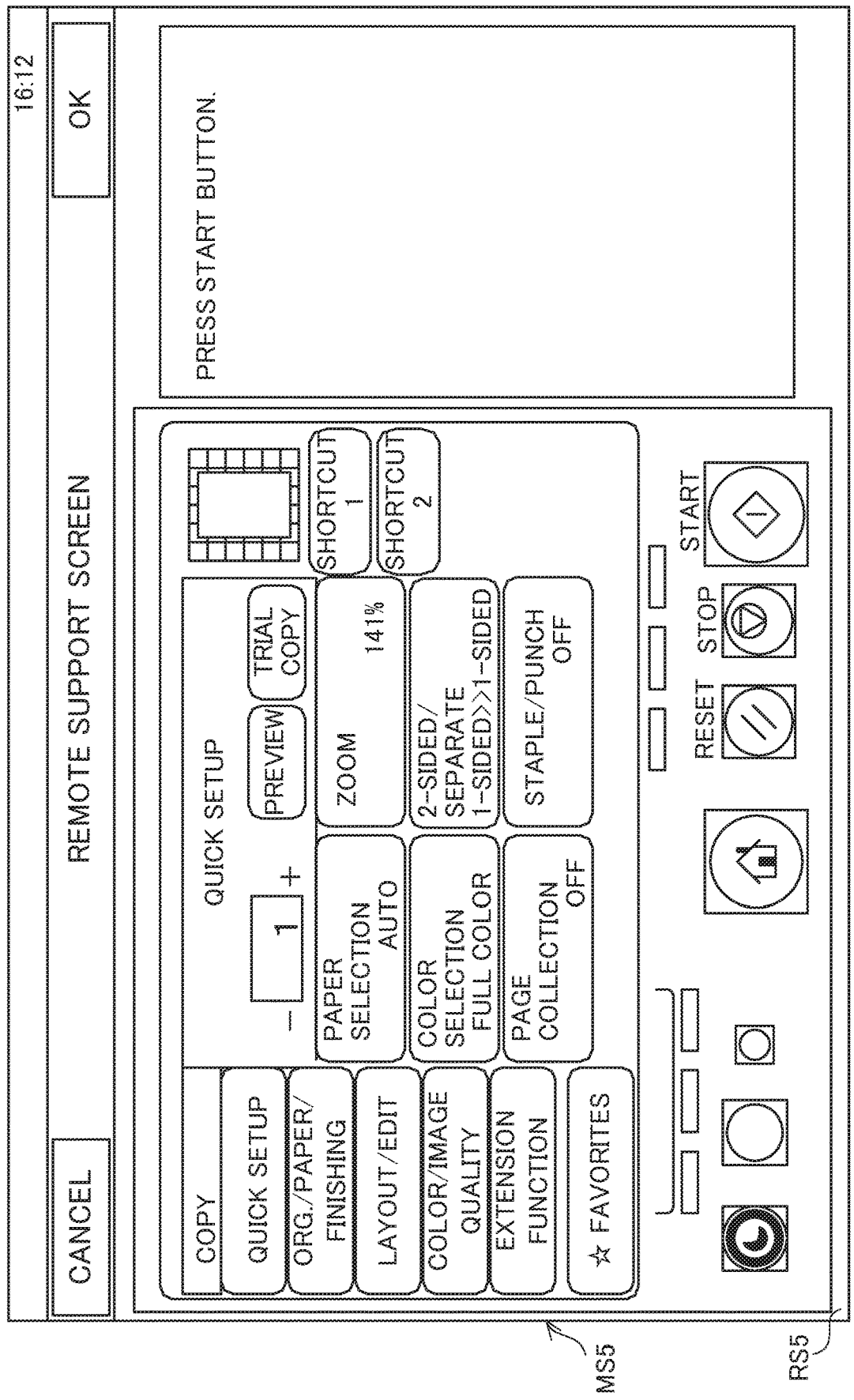

The pop-up PU1 closes as the "141%" button on the pop-up PU1 is pressed down. Thus, an operation screen RS5 shown in FIG. 8A does not include the pop-up PU1, but includes an image KS that represents the hard keys provided on the operation device 47 of the image forming apparatus 1. Also, the lower low of the "zoom" button has been switched from displaying "100%" to "141%". An operation screen MS5 shown in FIG. 8B is a display screen to be displayed on the display 473 of the image forming apparatus 1 and includes the operation screen RS5 displayed on the operator terminal 2.

On the operation screens RS5 and MS5, it is explained that a "start" button, one of the hard keys, should be pressed. At a time where the operation screen MS5 is being displayed on the display 473, the operation command of pressing down the "start" button is sent from the operator terminal 2 to the image forming apparatus 1 by the instruction of the operator.

The support information manager 103 associates the operation procedure data that is formed by including the series of the operation commands sent from the operator terminal 2 (i.e., the series of the operation inputted at the operator terminal 2) with the remote support screen, and furthermore, adds, to the operation procedure data, by each of the operation steps, information representing operation explanations and the supplementary explanations, and causes the support information storage 112 to store the operation procedure data as the support information. The support information manager 103 adds a title name and a support-information provider name to the support information and causes the support information storage 112 to store the support information.

For example, when the operation support is performed for "how to scale up A4 to A3 and copy", the operation procedure data indicating the operation procedures detailed with reference to FIG. 5A to FIG. 8B, that is, "1. copy button", "2. zoom button", "3. set 141%", and "4. start button" is stored as the support information in the support information storage 112 by the support information manager 103.

For example, the operator uses the keyboard 22 of the operator terminal 2 to input the title name (such as "how to scale up A4 to A3 and copy") and the support-information provider name (such as "support center"), and the title name and the support-information provider name are sent from the operator terminal 2 to the image forming apparatus 1. The support information manager 103 adds the title name and the support-information provider name to the support information, and stores the support information in the support information storage 112.

Also, as the support information, together with the operation procedures, the support information manager 103 stores image data of the remote support screen, which is displayed on the display 473 in accordance with the series of operation (for example the operation screens MS2 to MS5 shown in FIG. 5B, FIG. 6B, FIG. 7B, and FIG. 8B), in the support information storage 112 in association with the operation procedure data.

The support information manager 103 is preferably configured to also include the text data inputted as the supplementary explanation by use of the input area A1 into the support information and store the support information in the support information storage 112. Furthermore, if the audio data is inputted at the operator terminal 2 as the supplementary explanation and is sent to the image forming apparatus 1, the support information manager 103 is preferably configured to also include the audio data into the support information and store the support information in the support information storage 112.

The support information manager 103 reads out and obtains the support information from the support information storage 112. For example, when the instruction receiver 101 receives the user instruction requesting the support information to be displayed, the support information manager 103 reads out the title name and the support-information provider name stored in association with each piece of the support information stored in the support information storage 112, and causes the display 473 to display an operation screen MS6 including a list L1 as shown in FIG. 9. When the instruction receiver 101 receives from the user, through the operation device 47, the instruction of selecting one piece of support information from the list L1, the support information manager 103 reads out and obtains the support information indicated by the received instruction from the support information storage 112.

Based on the support information obtained by the support information manager 103, the display controller 104 causes the display 473 to display the operation procedures indicated by the operation procedure data included in the support information, and also causes the display 473 to display a screen based on the image data included in the support information (operation screens MS7 to MS12 shown in FIG. 10A to FIG. 12B, to be described later).

FIG. 10A to FIG. 12B are diagrams each showing an example of the screen switching when the display controller 104 causes the display 473 to display the support information, and showing the operation screen displayed on the display 473 of the image forming apparatus 1. Here, description will be given to the case where the support information whose title name is "how to scale up A4 to A3 and copy" is selected from the list L1 by the user.

On an operation screen MS7 displayed on the display 473 of the image forming apparatus 1 shown in FIG. 10A, operation procedures OP1 are displayed and a selection button B1 marked with "next" and a selection button B2 marked with "back" are displayed. When the instruction receiver 101 receives the instruction from the user on the selection button B1 marked with "next", the display controller 104 advances the screen displayed on the display 473 to the next page. When the instruction receiver 101 receives the instruction from the user on the selection button B2 marked with "back", the display controller 104 returns the screen displayed on the display 473 to one previous page.

Figure 10B:
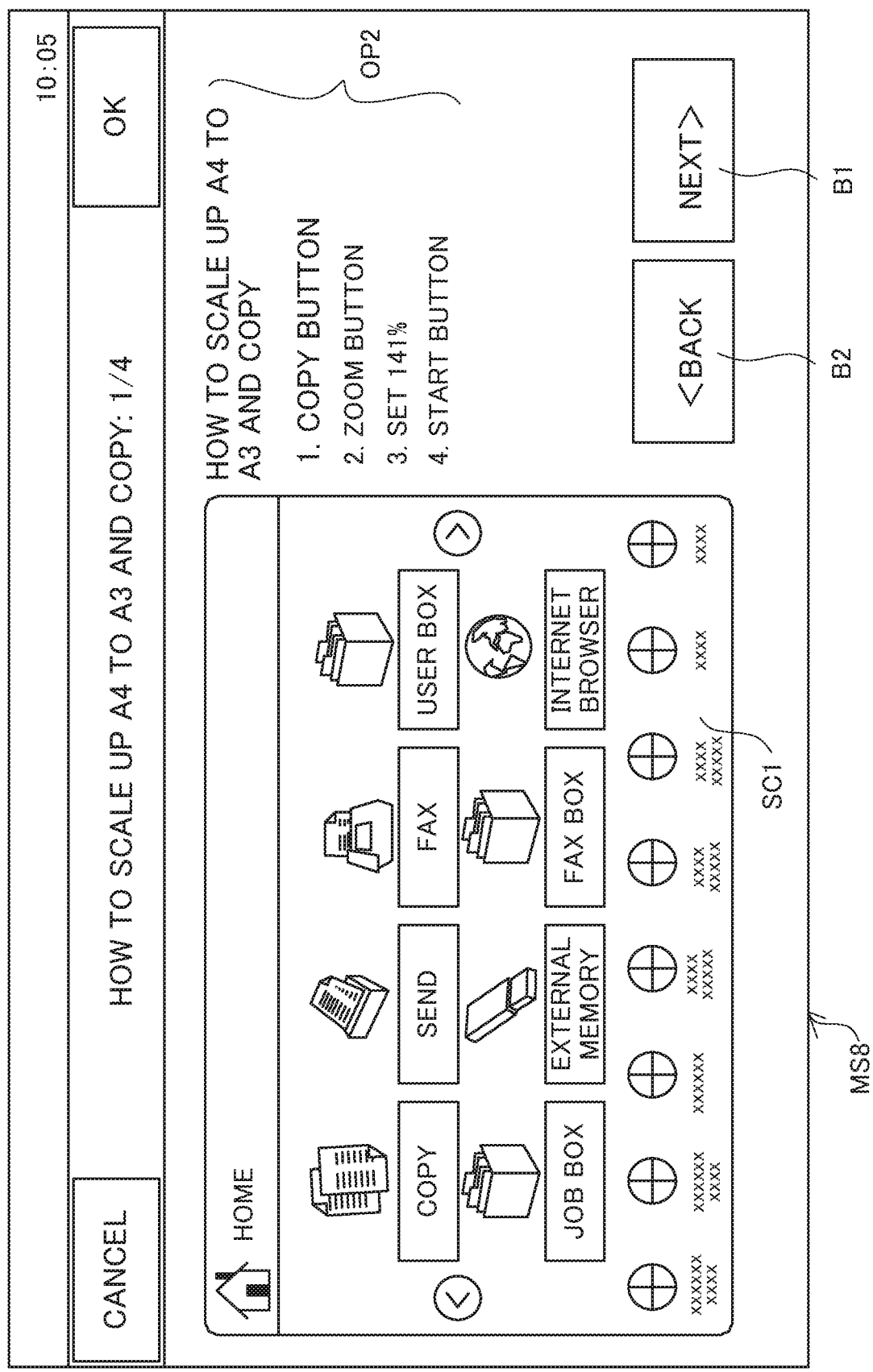

An operation screen MS8 shown in FIG. 10B is the screen that is one page advanced from the operation screen MS7, and includes the operation screen SC1 that is the "home" screen. Also, operation procedures OP2 are displayed on the operation screen MS8. Furthermore, the display controller 104 is preferably configured so as that the operation that should be performed on this screen (i.e., "1. copy button") can be distinguished from other operations by, for example, changing the display size or changing the concentration. In this embodiment, changing the display size is adopted.

Figure 13A:
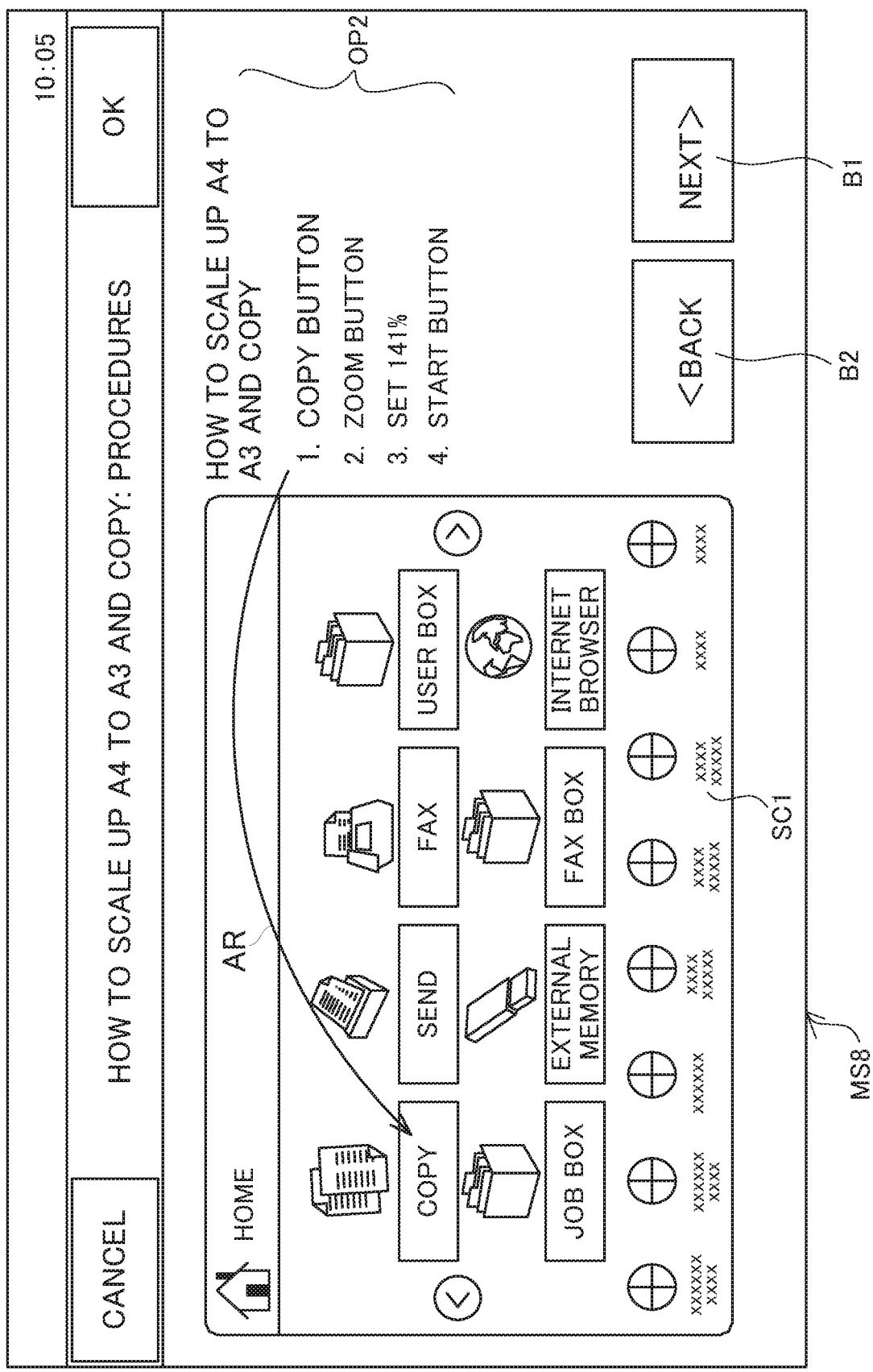
FIG. 13A and FIG. 13B are diagrams each showing an example of the screen displayed on the display of the image forming apparatus.
Figure 13B:
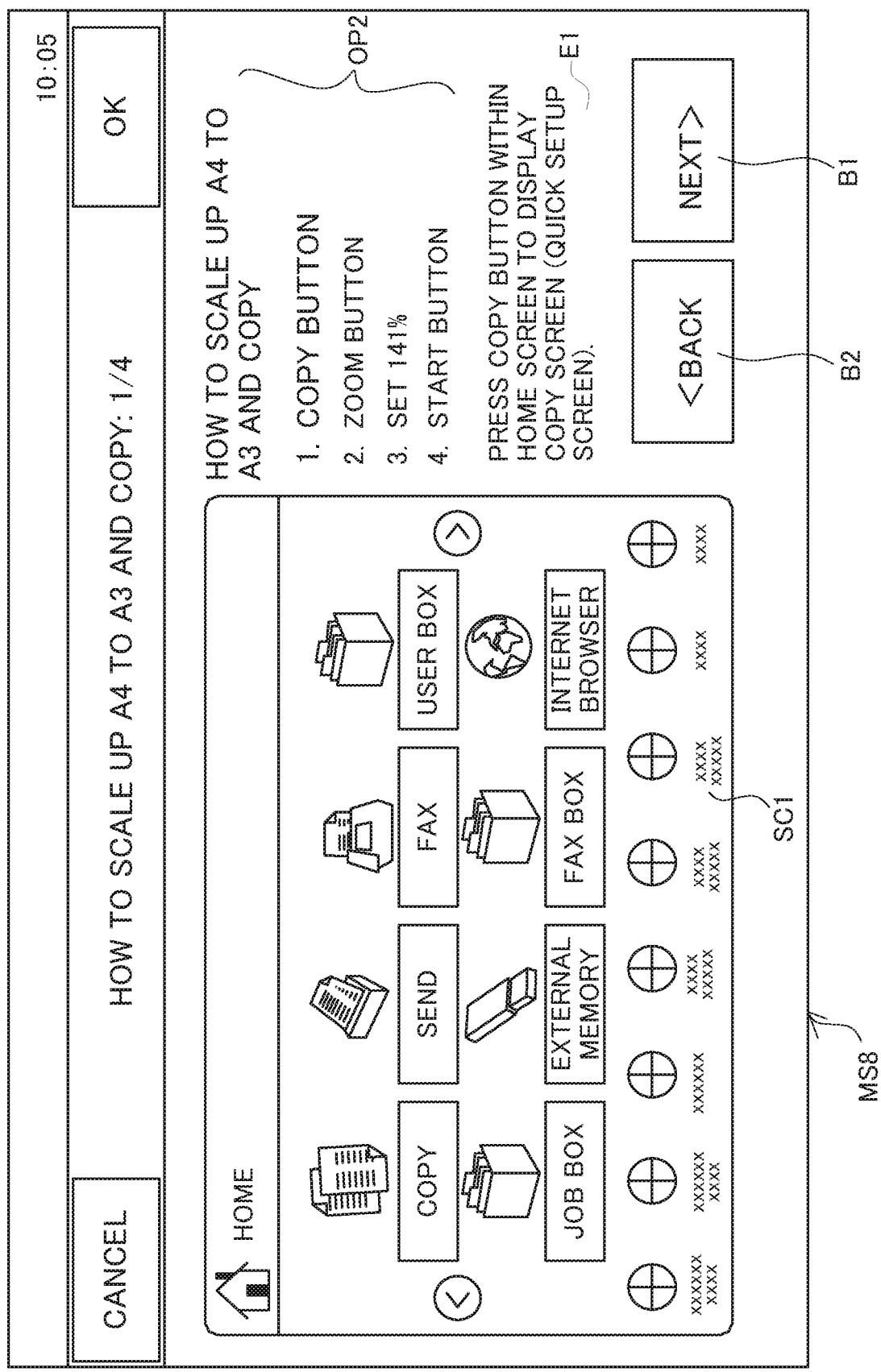

In another embodiment, as shown in FIG. 13A, the display controller 104 may be configured to indicate to the user a position of the button that should be operated by displaying an arrow AR or the like. In still another embodiment, the display controller 104 may be configured to display a supplementary explanation El based on the text data inputted by the operator at the operator terminal 2 as shown in FIG. 13B, or the controller 100 may be configured to cause the not-illustrated speaker to provide voice guide based on the audio data inputted by the operator at the operator terminal 2.

Figure 11A:
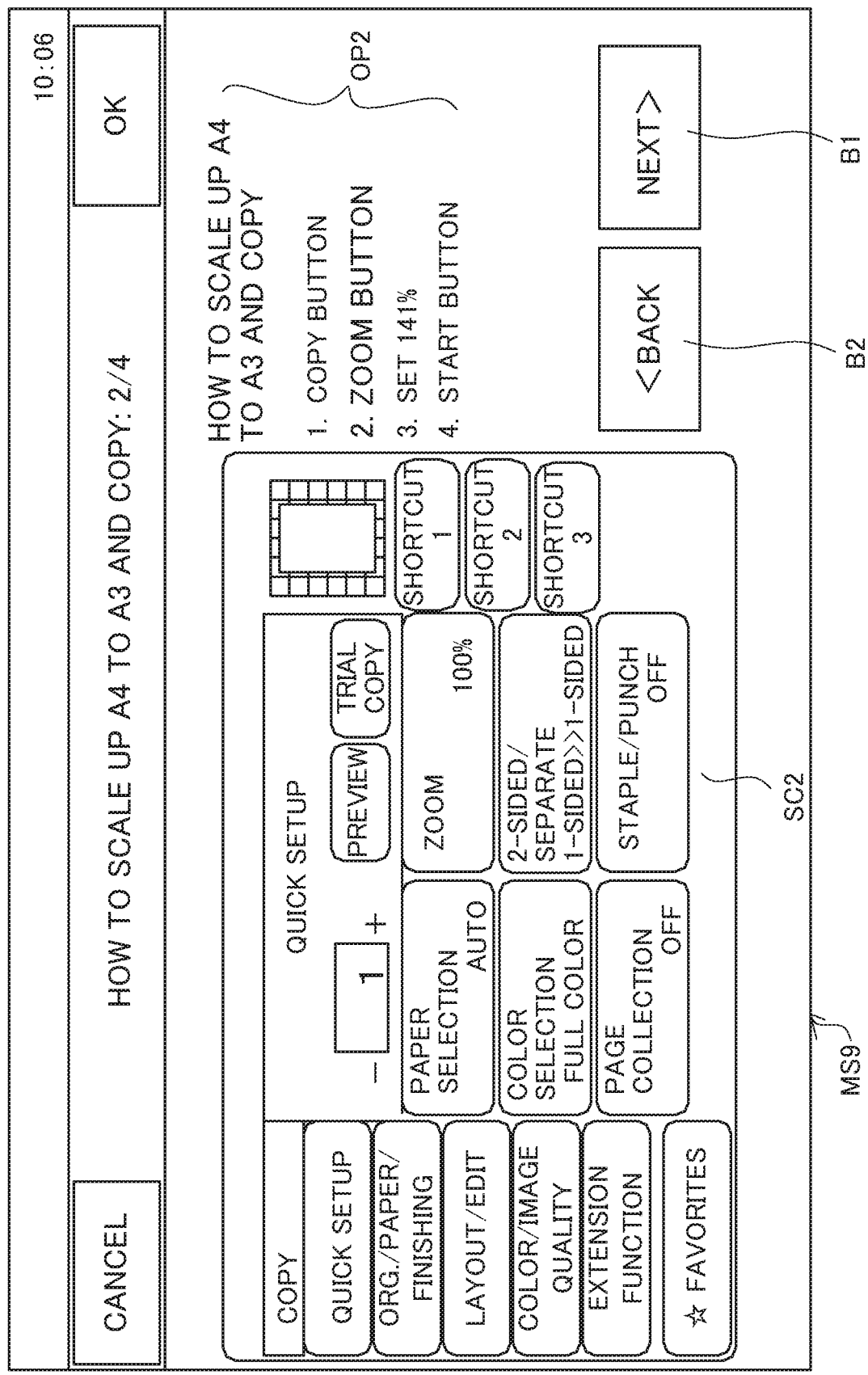
FIG. 11A and FIG. 11B are diagrams each showing an example of the screen switching when presenting the support information to the user, and each showing the operation screen displayed on the display of the image forming apparatus.

An operation screen MS9 shown in FIG. 11A is the screen that is one page advanced from the operation screen MS8, and includes the operation screen SC2 that is the "copy" screen ("quick setup" screen). Also, the operation procedures OP2 are displayed on the operation screen MS9. Furthermore, operations other than the operation that should be performed on this screen (i.e., operation on "2. zoom button") are displayed in a small size.

Figure 11B:
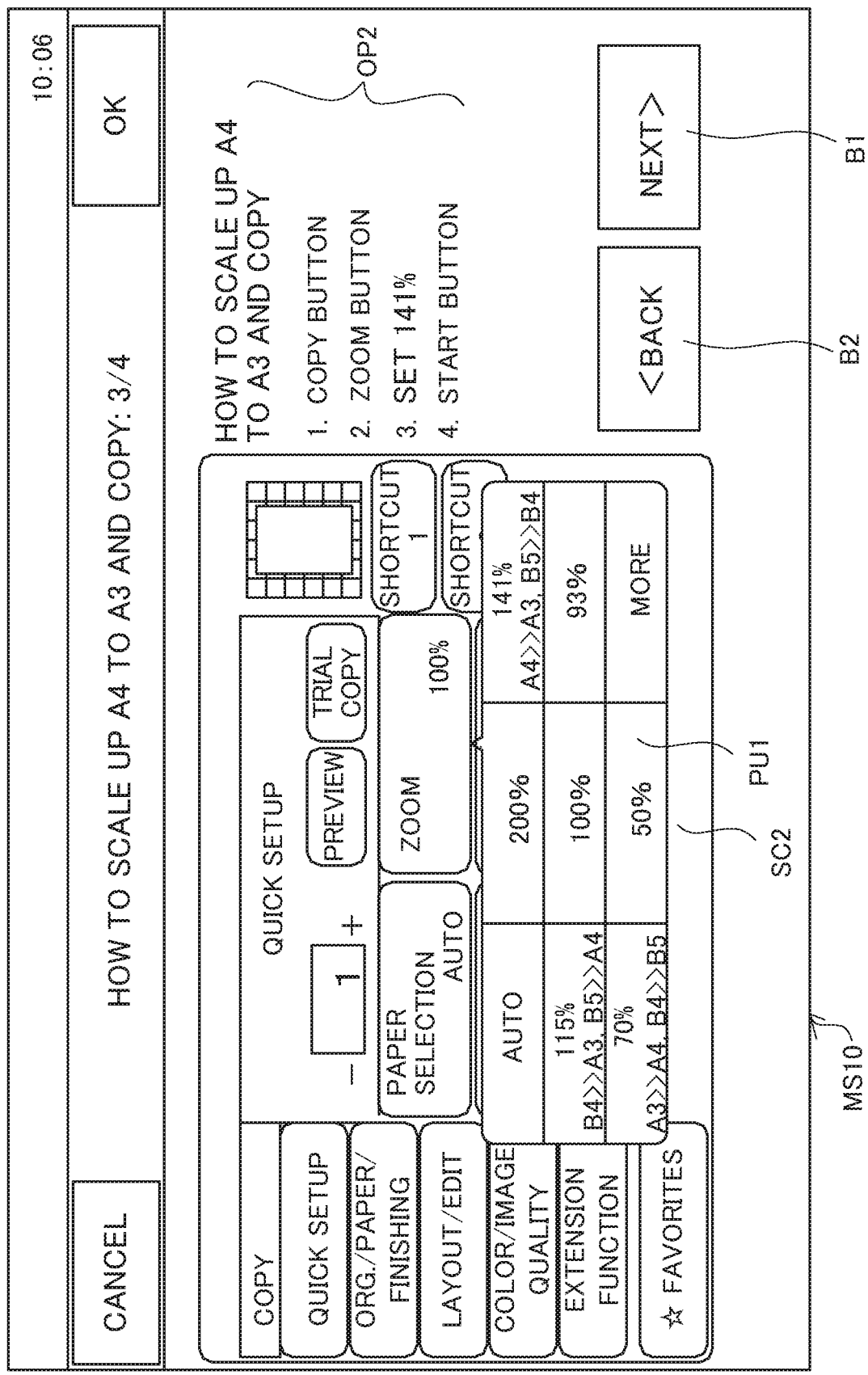

An operation screen MS10 shown in FIG. 11B is the screen that is one page advanced from the operation screen MS9, and includes the pop-up PU1 to be displayed on the most front surface of the "copy" screen. Also, the operation procedures OP2 are displayed on the operation screen MS10. Furthermore, operations other than the operation that should be performed on this screen (i.e., operation on "3. set 141%") are displayed in a small size.

Figure 12A:
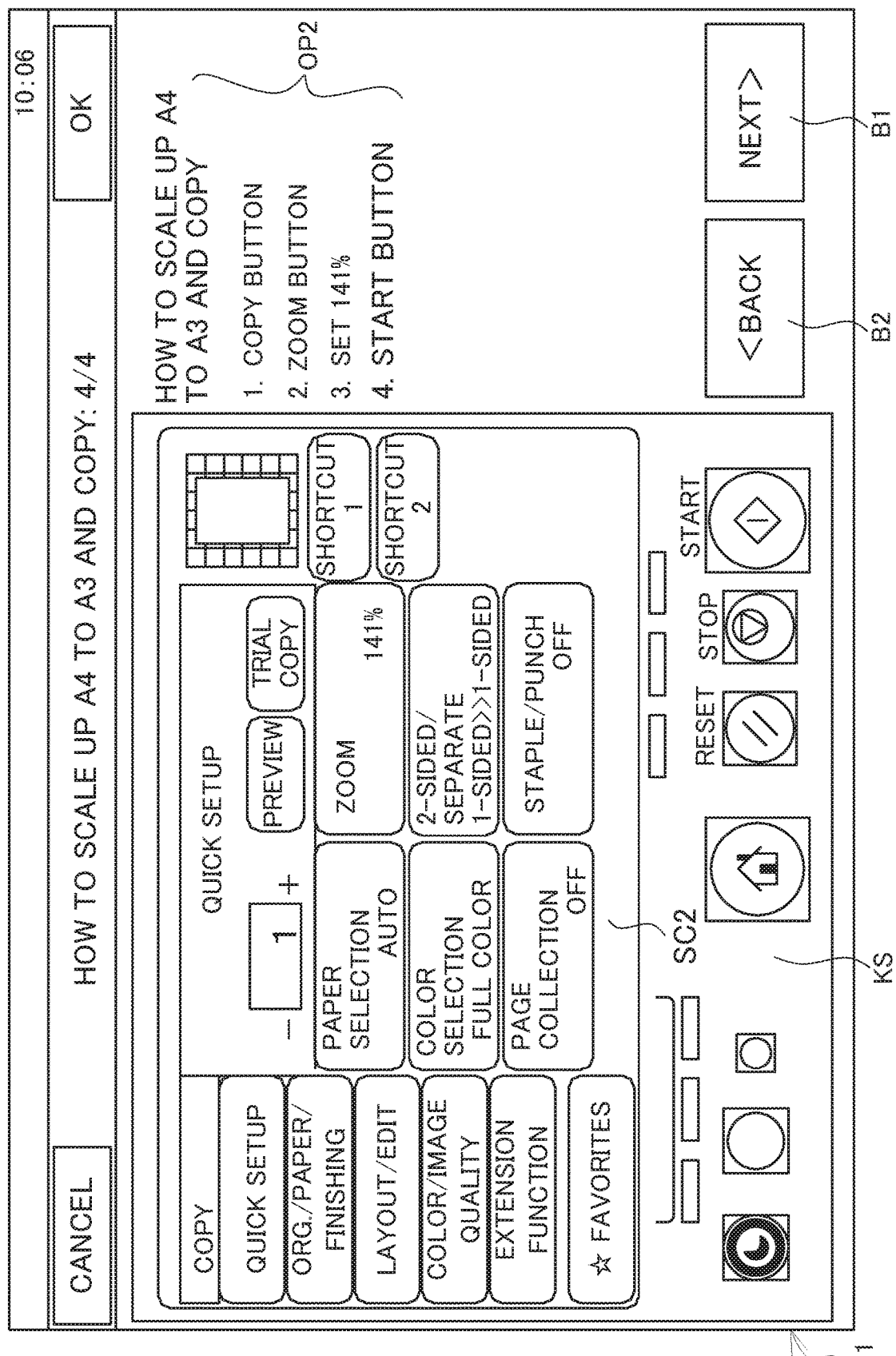
FIG. 12A and FIG. 12B are diagrams each showing an example of the screen switching when presenting the support information to the user, and each showing the operation screen displayed on the display of the image forming apparatus.

An operation screen MS11 shown in FIG. 12A is the screen that is one page advanced from the operation screen MS10, and includes the image KS that represents the hard keys provided on the operation device 47 of the image forming apparatus 1. Also, the operation procedures OP2 are displayed on the operation screen MS11. Furthermore, operations other than the operation that should be performed on this screen (i.e., operation on "4. start button") are displayed in a small size.

Figure 12B:
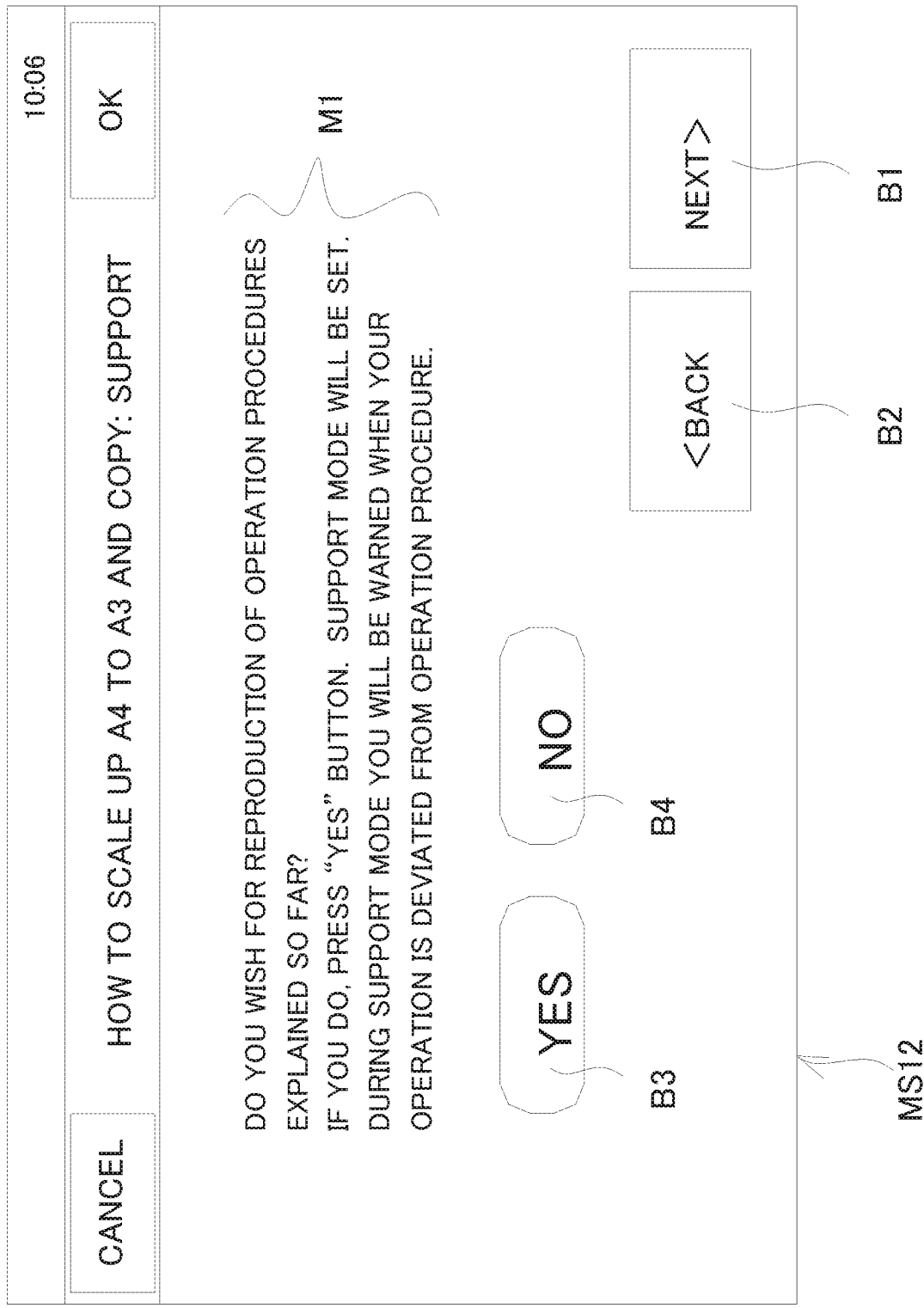

An operation screen MS12 shown in FIG. 12B is the screen that is one page advanced from the operation screen MS11, and is the screen asking the user whether or not to receive the operation support to the operations indicated by the operation procedures OP1 and OP2 displayed on the display 473. On the operation screen MS12, a message M1 for asking the user whether or not to set the support mode that supports the operation is displayed, and in addition, a selection button B3 marked with "YES" and a selection button B4 marked with "NO" are displayed. Here, not related to the remotely performed control by the operator terminal 2 and the display of the operation screen MS11 and the like, the display controller 104 may be configured to cause, after the support information is stored in the support information storage 112, the display 473 to display the operation screen MS12 in accordance with the instruction received by the instruction receiver 101 based on the operation of the operation device 47 by the user. In this case, a series of processing based on the support mode to be descried hereunder is executed without relating to the remotely performed control by the operator terminal 2 and the display of the operation screen MS11 and the like.

When the pressing by the user on the selection button B3 marked with "YES" is received by the touch panel and the instruction receiver 101 receives a setting instruction for the support mode associated with the pressing, the controller 100 sets the support mode. When the pressing by the user on the selection button B4 marked with "NO" is received by the touch panel and the instruction receiver 101 receives a non-setting instruction for the support mode associated with the pressing, the controller 100 does not set the support mode.

When the support mode is set, based on the operation procedure data included in the support information obtained by the support information manager 103, the determiner 105 collates the operation procedure indicated by the operation procedure data with the instruction from the user received by the instruction receiver 101, and determines whether the instruction from the user coincides with the operation procedure.

When the determiner 105 determines that the instruction from the user does not coincide with the operation procedure, the display controller 104 causes the display 473 to display a message reporting that the instruction from the user is deviated from the operation procedure.

Hereinafter, description will be given to an example of the processing performed by the control device 10 of the image forming apparatus 1 with reference to a flowchart shown in FIG. 14. This processing is performed when the instruction receiver 101 receives the user instruction of setting the support mode.

Under a state where the support mode is being set by the controller 100 (S1), when the instruction receiver 101 receives the instruction from the user (S2), the determiner 105 collates the instruction from the user received by the instruction receiver 101 with the operation procedure indicated by the operation procedure data included in the support information obtained by the support information manager 103, and determines whether the instruction from the user coincides with the operation procedure (S3).

When the determiner 105 determines that the instruction from the user coincides with the operation procedure (YES at S3), the controller 100 determines whether the operation is completed or not (S4).

In determining that the operation is completed (YES at S4), the controller 100 releases the support mode and returns to the normal mode (S5). Then, the processing ends.

On the other hand, when the controller 100 determines that the operation is not completed (NO at S4), the processing goes back to step S2.

At step S3, when the determiner 105 determines that the instruction from the user does not coincide with the operation procedure (the instruction from the user is deviated from the operation procedure) (NO at S3), the display controller 104 controls the display 473 to display the message reporting that the instruction from the user is deviated from the operation procedure and also a message asking the user whether the deviation from the operation procedure is okay to be continued or not (S6). FIG. 15 is a diagram showing an example of the screen displayed on the display 473.

On an operation screen MS13 shown in FIG. 15, a message M2 reporting that the instruction from the user is deviated from the operation procedure and a message M3 asking the user whether the deviation from the operation procedure is okay to be continued or not are displayed, and also, a selection button B5 marked with "YES" and a selection button B6 marked with "NO" are displayed.

The controller 100 determines if the instruction receiver 101 has received a reply from the user of "it is okay that deviation continues" (S7). In determining that the selection button B5 marked with "YES" has been pressed down and the instruction receiver 101 has received the reply from the user of "it is okay that deviation continues" (YES at S7), the controller 100 validates the instruction from the user deviated from the operation procedure (S8), releases the support mode, and returns to the normal mode (S5). Then, the processing ends.

On the other hand, in determining that the selection button B6 marked with "NO" has been pressed down and the instruction receiver 101 has received through the operation device 47 the reply from the user of "it is not okay that deviation continues" (NO at S7), the controller 100 invalidates the instruction from the user deviated from the operation procedure (S9). Then, the processing goes back to step S2.

According to the above embodiment, since content of the support received in the past from the operator terminal 2 is stored as the support information, the user can check the same content of the support later on. For example, the content of the support can also be used as an operation manual specific for the user by printing the content.

In addition, when the user performs the same operation on his/her own by following the operation procedures indicated by the content of the support, the message reporting the user that the instruction received from the user is deviated from the operation procedure, so that even if there is an operation error, the user can be aware of the operation error. This makes it possible for the user to surely reproduce the operation procedures. That is, the user can easily perform the same operation again by following the operation procedures indicated by the content of the support received in the past.

Even if the user can check later on the content of the operation (i.e., the content of the support received in the past) in the techniques described in the above BACKGROUND, the user may not always be able to precisely reproduce the operation procedures indicated by the content of the operations.

In contrast, the present embodiment is capable of allowing the user to easily perform the same operation again by following the operation procedures indicated by the content of the support received in the past.

In the above embodiment, when the instruction from the user is deviated from the operation procedure, the message reporting such situation to the user is displayed. As another embodiment, when the user performs the same operation on his/her own by following the operation procedures indicated by the content of the support, it may be configured that based on the operation procedure data included in the support information obtained by the support information manager 103, the display controller 104 changes a display manner of the operation button that should be operated to be different from a display manner of other operation button, or the instruction receiver 101 does not receive operation on the operation button that should not be operated.

The disclosure may be modified in various manners, without limitation to the above embodiments. Although the MFP exemplifies the electronic apparatus according to the present disclosure in the foregoing embodiments, the disclosure is also applicable to, for example, different types of image forming apparatuses or electronic apparatuses having copy function, a printer function, and facsimile function.

The configurations and processing according to the foregoing embodiments described with reference to FIG. 1 to FIG. 15 are merely exemplary, and in no way intended to limit the disclosure to those configurations and arrangements.

While the present disclosure has been described in detail with reference to the embodiments thereof, it would be apparent to those skilled in the art the various changes and modifications may be made therein within the scope defined by the appended claims.

What is claimed is:

1. An electronic apparatus including a display, the electronic apparatus comprising:
an operation device to which a user instruction is inputted from a user;
a communication device that communicates with an operator terminal capable of performing operation support to the electronic apparatus from a remote place; and
a control device that includes a processor and, through the processor executing a control program, acts as:
a remote operation executor that executes remote operation that receives the operation support from the operator terminal through the communication device;
an instruction receiver that receives the user instruction inputted to the operation device;
a support information manager that causes a support information storage to store operation procedure data as support information, the operation procedure data indicating a series of operation operated in accordance with the remote operation; and a display controller that, based on the support information obtained from the support information storage by the support information manager, causes the display to display an operation procedure indicated by the operation procedure data included in the support information, wherein through the processor executing the control program, the control device further acts as a determiner that, when the display controller is in a state of causing the display to display the operation procedure indicated by the operation procedure data, collates the operation procedure with the user instruction received by the instruction receiver and determines whether the user instruction coincides with the operation procedure, and when the determiner determines that the user instruction does not coincide with the operation procedure, the display controller causes the display to display a notification reporting that the user instruction is deviated from the operation procedure.

2. The electronic apparatus according to claim 1, wherein the display controller causes the display to display, together with the notification reporting that the user instruction is deviated from the operation procedure, a notice asking the user whether the deviation from the operation procedure is okay to be continued or not, and through the processor executing the control program, the control device further acts as a controller that, when the instruction receiver receives through the operation device a reply from the user that the deviation from the operation procedure is not okay to be continued, makes the user instruction deviated from the operation procedure be ineffective, and when the instruction receiver receives a reply from the user that the deviation from the operation procedure is okay to be continued, makes the user instruction deviated from the operation procedure be effective.

3. An electronic apparatus including a display,
the electronic apparatus comprising:
an operation device to which a user instruction is inputted from a user;

a communication device that communicates with an operator terminal capable of performing operation support to the electronic apparatus from a remote place; and a control device that includes a processor and, through the processor executing a control program, acts as:

a remote operation executor that executes remote operation that receives the operation support from the operator terminal through the communication device;

an instruction receiver that receives the user instruction inputted to the operation device;

a support information manager that causes a support information storage to store operation procedure data as support information, the operation procedure data indicating a series of operation operated in accordance with the remote operation; and a display controller that, based on the support information obtained from the support information storage by the support information manager, causes the display to display an operation procedure indicated by the operation procedure data included in the support information, wherein the support information manager adds a title name and a support-information provider name to the support information, and causes the support information storage to store the support information, and when the instruction receiver receives the user instruction requesting display of the support information, the support information manager reads out the title name and a support-information provider name stored in association with each piece of the support information stored in the support information storage, causes the display to display a list showing each piece of the support information, and reads out and obtains, when the instruction receiver receives from the user a user instruction to select one piece of support information from the list, the support information that the user instruction indicates from the support information storage.

* * * * *